United States Patent
Moriya et al.

(10) Patent No.: US 10,264,289 B2
(45) Date of Patent: Apr. 16, 2019

(54) VIDEO ENCODING DEVICE, VIDEO DECODING DEVICE, VIDEO ENCODING METHOD, AND VIDEO DECODING METHOD

(71) Applicant: MITSUBISHI ELECTRIC CORPORATION, Tokyo (JP)

(72) Inventors: Yoshimi Moriya, Tokyo (JP); Kazuo Sugimoto, Tokyo (JP); Akira Minezawa, Tokyo (JP); Shunichi Sekiguchi, Tokyo (JP); Norimichi Hiwasa, Tokyo (JP); Yusuke Itani, Tokyo (JP); Ryoji Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 142 days.

(21) Appl. No.: 14/409,967

(22) PCT Filed: May 27, 2013

(86) PCT No.: PCT/JP2013/003320
§ 371 (c)(1),
(2) Date: Dec. 19, 2014

(87) PCT Pub. No.: WO2014/002375
PCT Pub. Date: Jan. 3, 2014

(65) Prior Publication Data
US 2015/0195582 A1   Jul. 9, 2015

(30) Foreign Application Priority Data
Jun. 26, 2012   (JP) .................................. 2012-142607

(51) Int. Cl.
*H04N 19/91* (2014.01)
*H04N 19/30* (2014.01)
(Continued)

(52) U.S. Cl.
CPC ........... *H04N 19/91* (2014.11); *H04N 19/103* (2014.11); *H04N 19/122* (2014.11);
(Continued)

(58) Field of Classification Search
CPC ...... H04N 7/50; H04N 19/91; H04N 19/1883; H04N 7/26106; H04N 7/26244; H04N 7/26335; H04N 7/26941
See application file for complete search history.

(56) References Cited

U.S. PATENT DOCUMENTS 5,510,840 A * 4/1996 Yonemitsu ............... H04N 7/54
375/240.15
2004/0125124 A1* 7/2004 Kim .................. G06F 17/30799
715/716
(Continued)

FOREIGN PATENT DOCUMENTS

JP    2007-508737 A    4/2007
JP    2009-521174 A    5/2009
(Continued)

OTHER PUBLICATIONS

Boyce et al., "Parameter sets modifications for temporal scalability and extension hooks", Joint Collaborative Team on Video Coding (JCT-VC) of ITU-TSG 16 WP3 and ISO/IEC JTC 1/SC 29/WG 11, Document: JCTVC-I0230v3, Apr. 27-May 7, 2012, pp. 1-9.
(Continued)

*Primary Examiner* — Shawn S An
(74) *Attorney, Agent, or Firm* — Birch, Stewart, Kolasch & Birch, LLP

(57) ABSTRACT

Since time hierarchically encoded video data needs to include video data of a basic hierarchical layer, and video data cannot be generated in which a frame belonging to an upper hierarchical layer is only encoded, even in a case in which only a part of frames is processed, a basic hierarchical
(Continued)

layer frame is needed to be included, and thus, there has been a problem that video data in which only the frame belonging to the upper hierarchical layer is encoded cannot be separately processed. In the present invention, a variable length encoding unit is disposed which encodes, for each sequence, a basic hierarchical layer existence flag showing whether or not a basic hierarchical layer is included in the sequence.

4 Claims, 25 Drawing Sheets

(51) Int. Cl.
| | |
|---|---|
| H04N 21/845 | (2011.01) |
| H04N 19/169 | (2014.01) |
| H04N 19/597 | (2014.01) |
| H04N 19/70 | (2014.01) |
| H04N 19/122 | (2014.01) |
| H04N 19/103 | (2014.01) |
| H04N 19/463 | (2014.01) |
| H04N 19/124 | (2014.01) |
| H04N 19/136 | (2014.01) |
| H04N 19/186 | (2014.01) |
| H04N 19/82 | (2014.01) |
| H04N 19/31 | (2014.01) |
| H04N 19/573 | (2014.01) |

(52) U.S. Cl.
CPC ......... *H04N 19/124* (2014.11); *H04N 19/136* (2014.11); *H04N 19/186* (2014.11); *H04N 19/188* (2014.11); *H04N 19/1883* (2014.11); *H04N 19/30* (2014.11); *H04N 19/31* (2014.11); *H04N 19/463* (2014.11); *H04N 19/573* (2014.11); *H04N 19/597* (2014.11); *H04N 19/70* (2014.11); *H04N 19/82* (2014.11); *H04N 21/8451* (2013.01)

(56) References Cited

U.S. PATENT DOCUMENTS

| | | | |
|---|---|---|---|
| 2006/0221418 A1* | 10/2006 | Lee | H04N 19/52 358/539 |
| 2006/0233247 A1* | 10/2006 | Visharam | G11B 27/3027 375/240.12 |
| 2008/0273592 A1 | 11/2008 | Van Der Stok et al. | |
| 2009/0010331 A1 | 1/2009 | Jeon et al. | |
| 2013/0156099 A1* | 6/2013 | Sasai | H04N 19/00424 375/240.03 |
| 2013/0259393 A1* | 10/2013 | Deshpande | G06T 9/00 382/232 |

FOREIGN PATENT DOCUMENTS

| | | |
|---|---|---|
| JP | 2009-538086 A | 10/2009 |
| WO | WO 2006/104357 A1 | 10/2006 |

OTHER PUBLICATIONS

Schwarz et al., "Overview of the Scalable Video Coding Extension of the H.264/AVC Standard", IEEE, Transactions on Circuits and Systems for Video Technology, vol. 17, No. 9, Sep. 2007, pp. 1103-1120.
Boyce et al., "Information for Scalable Extension High Layer Syntax," Joint Collaborative Team on Video Coding (JCT-VC) of ITU-T SG16 WP3 and ISO/IEC JTC1/SC29/WG11, 8th Meeting, Feb. 1-10, 2012 (Date Saved: Jan. 25, 2012), JCTVC-H0386, pp. 1-8 (9 pages).
Rathgen et al., "Modifications of and additions to the VM on the SVC file format," ISO/IEC JTC1/SC29/WG11, MPEG2006/M12923, Bankgkok, Thailand, Jan. 2006, pp. 1-13.
Sugimoto et al., "AHG 10: Proposed Modification to video parameter set," Joint Collaborative Team on Video Coding (JCT-VC) of ITU-T SG 16 WP 3 and ISO/IEC JTC 1/SC 29/WG 11, JCTVC-J0196, 10th Meeting: Stockholm, SE, Jul. 11-20, 2012, pp. 1-3.
Visharam et al., "Extensions to the ISO/AVC File Format to support the storage of the Scalable Video Coding (SVC) bit streams," ISO/IEC JTC1/SC29/WG11, MPEG2005/M12062, Busan, Korea, Apr. 2005, pp. 1-9.

* cited by examiner

| Intra prediction mode index | Intra prediction mode |
|---|---|
| 0 | Planar prediction |
| 1 | Vertical prediction |
| 2 | Holizontal prediction |
| 3 | Average (DC) prediction |
| 4 ⋯ N$_I$-1 | Diagonal prediction |

N$_I$ : Intra prediction mode number

VIDEO ENCODING DEVICE, VIDEO DECODING DEVICE, VIDEO ENCODING METHOD, AND VIDEO DECODING METHOD

TECHNICAL FIELD

The present invention relates to a video encoding device for and a video encoding method of encoding a moving image with a high degree of efficiency, and a video decoding device for and a video decoding method of decoding an encoded moving image with a high degree of efficiency.

BACKGROUND ART

Scalable coding is a technology in which an image is encoded hierarchically, i.e. coarse information through fine information. Here, when encoded data of a basic hierarchical layer configured with the coarsest information is decoded, a decoded video having the lowest quality is obtained; when encoded data of the basic hierarchical layer and a first hierarchical layer is decoded, a decoded video having a middle quality is obtained; and, when encoded data of a second hierarchical layer is also decoded, a decoded video having a high quality is obtained. The scalable coding is an encoding method in which quality of a decoded video increases as the number of decoded hierarchical layers increases.

The SVC (see Non-Patent Document 1) is a scalable coding method which has been standardized as an extended method of the MPEG-4 AVC/H.264 coding method, and supports temporal scalability (hereinafter, referred to as "time hierarchical encoding"), spatial scalability, and SNR scalability.

FIG. 24 shows an example of video data which is time hierarchically encoded. In FIG. 24, frames indicated by arrows show those being referred to at inter frame prediction encoding. A frame (I0) to be decoded first is a frame which is predicted by using only pixel values of the frame, and does not refer to other frames. A frame (P1) to be decoded next generates a prediction image by referring to the already decoded I0 frame, and shows that a difference image against the generated prediction image is encoded. A frame (B2) to be decoded next generates a prediction image by referring to the already decoded two frames, i.e. I0 frame and P1 frame, and shows that a difference image against the generated prediction image is encoded. And, the same continues.

In FIG. 24, if the frames I0 and P1 are called as basic hierarchical layer frames (T0), the frame B2 as a first hierarchical layer frame, the frames B3 and B4 as second hierarchical layer frames, and the frames B5, B6, B7, and B8 as third hierarchical layer frames, the basic hierarchical layer frame is decoded by referring only to a frame belonging to the hierarchical layer of its own frame, the first hierarchical layer frame is decoded by referring only to frames belonging to the hierarchical layer of its own frame and to the basic hierarchical layer frame, and the same continues, i.e. decoding is carried out by referring only to frames belonging to the hierarchical layer of its own frame and to lower hierarchical layer frames.

While all the frames in video data can be decoded by decoding frames of all the hierarchical layers, if the frame belonging to the basic hierarchical layer frame is only decoded, one-eighth of the whole frame is decoded, and, if the frames belonging to the basic hierarchical layer and the first hierarchical layer are decoded, one-fourth of the whole frame is decoded. That is, encoding is carried out in such a manner that an image moving more fluently is decoded as the number of hierarchical layers to be decoded is increased.

Since the video data which is time hierarchically encoded as described above is configured so that part of frames thereof can be extracted to be decoded, the video data can be correctly decoded even if a decoding device is not compatible with scalable coding.

By encoding, in a parameter set of an upper header added to the top of video data, the maximum number of hierarchical layers when the video data is hierarchically encoded and a flag showing whether or not a frame belonging to each hierarchical layer uses, as a reference image, a frame belonging to upper hierarchical layers, a decoding device compatible with scalable coding can determine whether or not the video data is configured in a scalable manner and how much roughness can be expected in decoding when the data is configured in the scalable manner.

For example, in Non-Patent Document 2, a parameter set (video parameter set) for encoding the maximum number of hierarchical layers of video data which is time hierarchically encoded and a flag which shows a reference relationship among hierarchical layers, is encoded in an upper level than a parameter set of a sequence level.

FIG. 25 is a block diagram showing a configuration of a conventional video encoding device for generating video data which is time hierarchically encoded.

A video parameter set encoding unit 101 encodes the maximum number of hierarchical layers of video data and a flag which shows whether or not a frame belonging to each hierarchical layer uses, as a reference image, a frame belonging to upper hierarchical layers.

A sequence parameter set encoding unit 102 encodes an identification number showing which video parameter set is referred to by a sequence and parameters (resolution of video data, etc.) about a whole sequence of the video data.

A basic hierarchical layer frame encoding unit 103 encodes an identification number of a sequence parameter set to be referred to and a frame belonging to a basic hierarchical layer.

Similar to the basic hierarchical layer frame encoding unit 103, an upper hierarchical layer frame encoding unit 104 encodes frames belonging to upper hierarchical layers.

PRIOR ART DOCUMENTS

Non-Patent Documents

Non-Patent Document 1: Overview of the scalable video coding extension of the H.264/AVC standard, IEEE Transactions on Circuits and Systems for Video Technology, Vol. 17, No. 9, September 2007

Non-Patent Document 2: Parameter sets modifications for temporal scalability and extension hooks, JCT-VC Document JCTVC-I0230, April 2012, Geneva, CH

SUMMARY OF THE INVENTION

Problem that the Invention is to Solve

Since a conventional video encoding device for generating time hierarchically encoded video data is configured as described above, the time hierarchically encoded video data needs to include video data of a basic hierarchical layer, and video data in which only a frame belonging to an upper hierarchical layer is encoded cannot be generated. Therefore, even in a case in which only a part of frames is processed, a basic hierarchical layer frame needs to be included, and thus, there has been a problem that the video data in which only the frame belonging to the upper hierarchical layer is encoded cannot be separately processed.

The present invention has been made in order to solve the above-described problem, and an objective thereof is to obtain a video encoding device, a video decoding device, a video encoding method, and a video decoding method in which scalable decoding can be carried out in a decoding device even if a hierarchical encoding method is employed.

Means for Solving the Problem

In the present invention, a variable length encoding unit is disposed which encodes, for each sequence, a basic hierarchical layer existence flag showing whether or not a basic hierarchical layer is included in the sequence.

Advantageous Effects of the Invention

In accordance with the present invention, since a variable length encoding unit is disposed which encodes, for each sequence, a basic hierarchical layer existence flag showing whether or not a basic hierarchical layer is included in the sequence, an advantageous effect is obtained in which processes for scalable encoding and decoding can be carried out.

MODE FOR CARRYING OUT THE INVENTION

Embodiment 1

Figure 1:
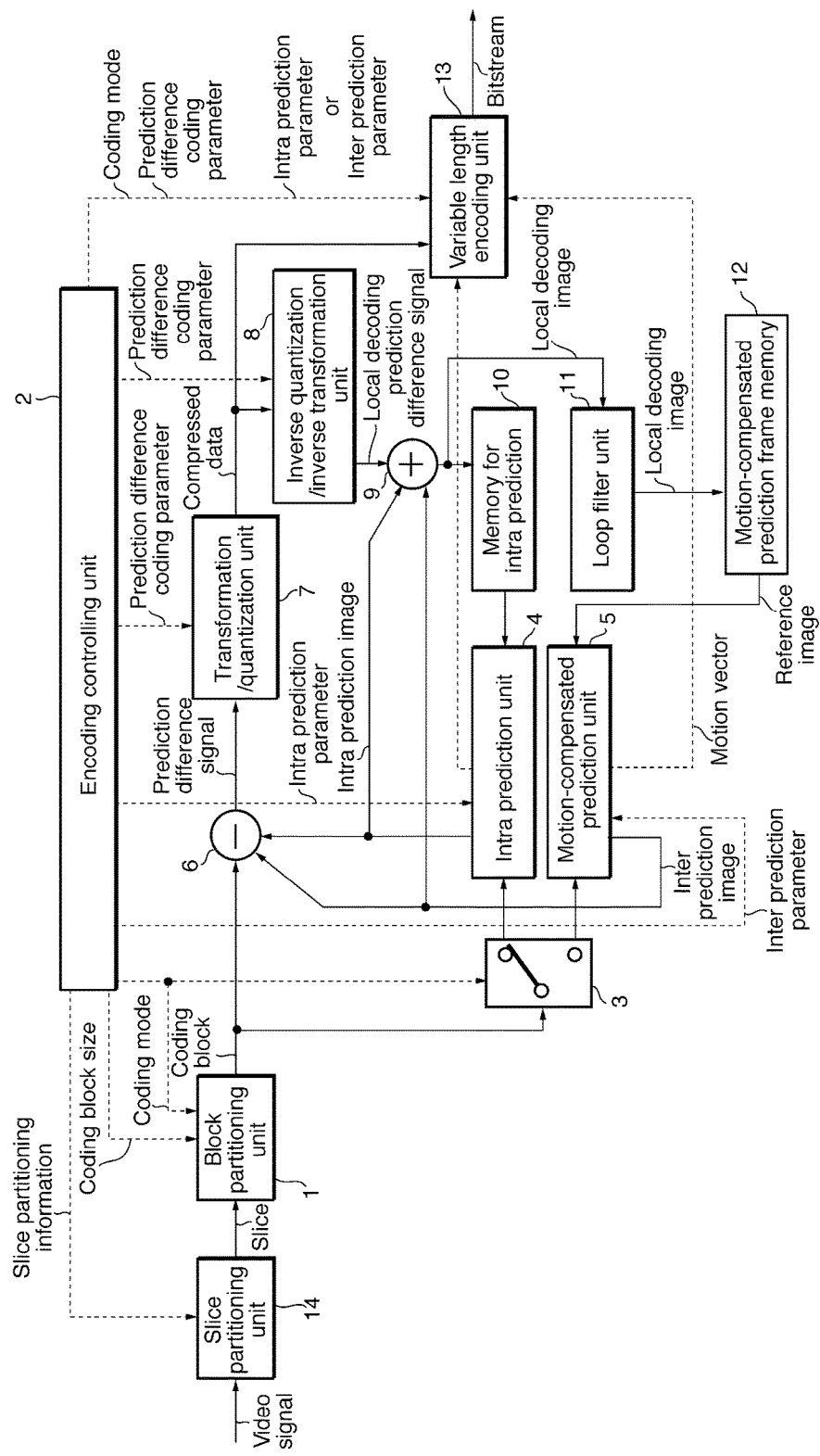
FIG. 1 is a block diagram showing a video encoding device in accordance with Embodiment 1 of the present invention.

FIG. 1 is a block diagram showing a video encoding device in accordance with Embodiment 1 of the present invention.

Referring to FIG. 1, when receiving a video signal as an inputted image, a slice partitioning unit 14 carries out a process of partitioning the inputted image into one or more partial images which are called "slices", according to slice partitioning information determined by an encoding controlling unit 2. A unit for slice partitioning can be made finer as small as a unit for coding block, which will be described later. The slice partitioning unit 14 constitutes a slice partitioning means.

A block partitioning unit 1 carries out a process of, whenever receiving a slice partitioned by the slice partitioning unit 14, partitioning the slice into largest coding blocks which are coding blocks each having a largest size determined by the encoding controlling unit 2, and also hierarchically partitioning each of the largest coding blocks into coding blocks until the number of hierarchical layers reaches an upper limit determined by the encoding controlling unit 2.

More specifically, the block partitioning unit 1 carries out a process of partitioning the slice into coding blocks according to partition determined by the encoding controlling unit 2, and outputting the coding blocks. Each of the coding blocks is further partitioned into one or more prediction blocks each of which serves as a unit for prediction process.

The block partitioning unit 1 constitutes a block partitioning means.

The encoding controlling unit 2 carries out a process of determining the largest size of the coding block serving as a unit for processing when an encoding process is carried out, and also determining the size of each coding block by determining the upper limit on the number of hierarchical layers when each coding block having the largest size is hierarchically partitioned.

The encoding controlling unit 2 also carries out a process of selecting a coding mode to be applied to a coding block outputted from the block partitioning unit 1, from among one or more selectable coding modes (one or more intra coding modes in which the size etc. of a prediction block which shows a unit for prediction process differs, and one or more inter coding modes in which the size etc. of a prediction block differs). As an example of selecting methods, there is a method of selecting a coding mode which provides the highest degree of coding efficiency for a coding block outputted from the block partitioning unit 1, from among the one or more selectable coding modes.

The encoding controlling unit 2 also carries out a process of, when a coding mode having the highest degree of coding efficiency is the intra coding mode, determining an intra prediction parameter, to be used when carrying out an intra prediction process on a coding block in the intra coding mode, for each prediction block serving as a unit for prediction process shown by the above-mentioned intra coding mode, and, when a coding mode having the highest degree of coding efficiency is the inter coding mode, determining an inter prediction parameter, to be used when carrying out an inter prediction process on a coding block in the inter coding mode, for each prediction block serving as a unit for prediction process shown by the above-mentioned inter coding mode.

The encoding controlling unit 2 further carries out a process of determining prediction difference coding parameters to be provided to a transformation/quantization unit 7 and an inverse quantization/inverse transformation unit 8. The prediction difference coding parameters include orthogonal transformation block partitioning information showing partitioning information about orthogonal transformation blocks each serving as a unit for orthogonal transformation process on a coding block and a quantization parameter defining a quantization step size when carrying out quantization on transform coefficients, etc.

The encoding controlling unit 2 constitutes an encoding controlling means.

A select switch 3 carries out a process of, when a coding mode determined by the encoding controlling unit 2 is the intra coding mode, outputting the coding block, outputted from the block partitioning unit 1, to an intra prediction unit 4, and, when a coding mode determined by the encoding controlling unit 2 is the inter coding mode, outputting the coding block, outputted from the block partitioning unit 1, to a motion-compensated prediction unit 5.

The intra prediction unit 4 carries out, when the intra coding mode is selected by the encoding controlling unit 2 as a coding mode corresponding to the coding block outputted from the select switch 3, an intra prediction process (intra-frame prediction process) on each prediction block serving as a unit for prediction process when performing the prediction process on the coding block, by using the intra prediction parameter determined by the encoding controlling unit 2 while referring to a local decoding image stored in a memory 10 for intra prediction, to perform a process of generating an intra prediction image.

The motion-compensated prediction unit 5 compares, when the inter coding mode is selected by the encoding controlling unit 2 as a coding mode corresponding to the coding block outputted from the select switch 3, the coding block with one or more frames of local decoding image stored in a motion-compensated prediction frame memory 12, for each prediction block serving as a unit for prediction process, to search for a motion vector, and carries out an inter prediction process (motion-compensated prediction process), for each prediction block, on the coding block by using the motion vector and the inter prediction parameter, such as a frame number to be referred to, determined by the encoding controlling unit 2, to perform a process of generating an inter prediction image.

The intra prediction unit 4, the memory 10 for intra prediction, the motion-compensated prediction unit 5, and the motion-compensated prediction frame memory 12 constitute a predicting means.

A subtracting unit 6 carries out a process of subtracting the intra prediction image generated by the intra prediction unit 4 or the inter prediction image generated by the motion-compensated prediction unit 5 from the coding block outputted from the block partitioning unit 1, and outputting a prediction difference signal showing a difference image which is the result of the subtraction, to the transformation/quantization unit 7. The subtracting unit 6 constitutes a difference image generating means.

The transformation/quantization unit 7 carries out an orthogonal transformation process (e.g., orthogonal transformation process, such as DCT (discrete cosine transform), DST (discrete sine transform), and KL transform in which bases are designed for specific learning sequence in advance), for each orthogonal transformation block, on the prediction difference signal outputted from the subtracting unit 6 by referring to the orthogonal transformation block partitioning information included in the prediction difference coding parameters determined by the encoding controlling unit 2, to calculate transform coefficients, and also carries out a process of quantizing the transform coefficients of each orthogonal transformation block by referring to the quantization parameter included in the prediction difference coding parameters and then outputting compressed data which are the transform coefficients quantized thereby, to the inverse quantization/inverse transformation unit 8 and a variable length encoding unit 13.

The transformation/quantization unit 7 constitutes an image compressing means.

When quantizing the transform coefficients, the transformation/quantization unit 7 may carry out a process of quantizing the transform coefficients by using a quantization matrix for scaling, for each of the transform coefficients, the quantization step size calculated from the above-described quantization parameter.

As for the quantization matrix, a matrix which is independent for each color signal and coding mode (intra coding or inter coding) on each orthogonal transformation size can be used, and each matrix can be selected from among a quantization matrix prepared in advance, as an initial value, commonly in a video encoding device and a video decoding device, a quantization matrix already encoded, and a new quantization matrix.

Thus, the transformation/quantization unit 7 sets, in a quantization matrix parameter to be encoded, flag information showing whether or not to use a new quantization matrix for each color signal and coding mode on each orthogonal transformation size.

The transformation/quantization unit 7 outputs the quantization matrix parameter which is set, to the variable length encoding unit 13 as a part of an adaptive parameter set.

The inverse quantization/inverse transformation unit 8 carries out a process of inverse-quantizing the compressed data, for each orthogonal transformation block, outputted from the transformation/quantization unit 7, by referring to the quantization parameter and the orthogonal transformation block partitioning information included in the prediction difference coding parameters determined by the encoding controlling unit 2, and also inverse orthogonal transforming the transform coefficients which are the compressed data inverse-quantized thereby, to calculate a local decoding prediction difference signal corresponding to the prediction difference signal outputted from the subtracting unit 6. When the transformation/quantization unit 7 carries out a quantization process by using a quantization matrix, a corresponding inverse quantization process is carried out, by referring to the quantization matrix, also in the inverse quantization process.

An adding unit 9 carries out a process of adding the local decoding prediction difference signal calculated by the inverse quantization/inverse transformation unit 8 and the intra prediction image generated by the intra prediction unit 4 or the inter prediction image generated by the motion-compensated prediction unit 5, to calculate a local decoding image corresponding to the coding block outputted from the block partitioning unit 1.

The inverse quantization/inverse transformation unit 8 and the adding unit 9 constitute a local decoding image generating means.

The memory 10 for intra prediction is a recording medium for storing the local decoding image calculated by the adding unit 9.

A loop filter unit 11 carries out a predetermined filtering process on the local decoding image calculated by the adding unit 9, and carries out a process of outputting the local decoding image filtering-processed thereby.

Concretely, the loop filter unit performs a filtering (deblocking filtering) process of reducing distortion occurring at a boundary between orthogonal transformation blocks and at a boundary between prediction blocks, a process (pixel adaptive offset process) of adaptively adding an offset on a per pixel basis, an adaptive filtering process of adaptively switching among linear filters, such as Wiener filters, to perform the filtering process, and so on.

Figure 2:
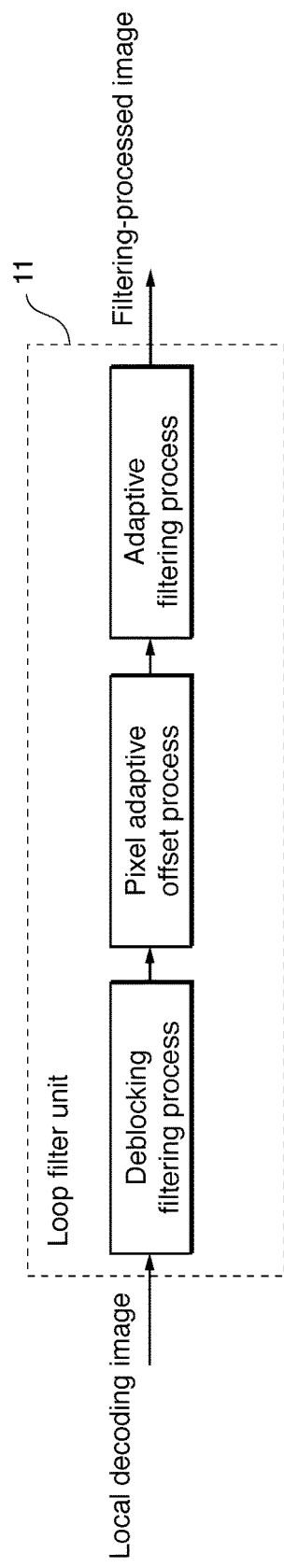
FIG. 2 is an explanatory drawing showing an example of a configuration of using a plurality of loop filtering processes in a loop filter unit of the video encoding device in accordance with Embodiment 1 of the present invention.

The loop filter unit 11 determines whether or not to perform each of the above-mentioned deblocking filtering process, pixel adaptive offset process, and adaptive filtering process, and outputs a valid flag of each process, as a part of the adaptive parameter set and a part of a slice level header which are to be encoded, to the variable length encoding unit 13. When a plurality of above-mentioned filtering processes are used, the filtering processes are performed sequentially. FIG. 2 shows an example of a configuration of the loop filter unit 11 when the plurality of filtering processes are used.

In general, although the image quality improves with the increase in the number of types of filtering processes to be used, the processing load increases on the other hand. More specifically, there is a trade-off between the image quality and the processing load. Also, an image quality improving effect of each filtering process differs depending on characteristics of images subjected to the filtering process. Thus, the filtering process to be used can be determined according to the processing load acceptable to the video encoding device and the characteristics of images subjected to the encoding process.

The loop filter unit 11 constitutes a filtering means.

In the deblocking filtering process, various parameters to be used for selecting the intensity of the filter applied to a block boundary can be changed from initial values. When the change is made, the concerning parameter is outputted, as a part of the adaptive parameter set to be encoded, to the variable length encoding unit 13.

In the pixel adaptive offset process, an image is partitioned into a plurality of blocks first. A case of not carrying out the offset process is defined as one of class classifying methods, and one class classifying method is selected, for each of the blocks, from among a plurality of class classifying methods which are prepared in advance.

Next, by using the selected class classifying method, each pixel included in the block is classified into one of classes, and an offset value for compensating distortion is calculated for each of the classes.

Finally, a process of adding the offset to a luminance value of the local decoding image is carried out, thereby improving the image quality of the local decoding image.

Therefore, in the pixel adaptive offset process, block partitioning information, an index indicating the class classifying method for each of the blocks, and offset information for identifying the offset value for each class of each of the blocks are outputted, as a part of the adaptive parameter set to be encoded, to the variable length encoding unit 13.

Note that, in the pixel adaptive offset process, an image may be always partitioned into fixed size blocks, e.g. the largest coding block, a class classifying method may be selected for each of the blocks, and an adaptive offset process for each of the classes may be performed. In this case, since the above-described block partitioning information is not necessary, a code amount can be reduced by an amount needed for the block partitioning information.

In the adaptive filtering process, a local decoding image is class classified by using a predetermined method, a filter for compensating distortion piggybacked thereonto is designed for a region (local decoding image) belonging to each of classes, and a filtering process is performed on the local decoding image by using the filter.

Filters designed for the respective classes are outputted, as a part of the adaptive parameter set to be encoded, to the variable length encoding unit 13.

As to the class classifying method, there are a simplified method of spatially separating an image with an equal interval, and a method of classifying on a per block basis according to local characteristics (scatter, etc.) of an image.

As for the number of classes used in the adaptive filtering process, a value may be set in advance commonly for a video encoding device and a video decoding device, or may be set in a part of the adaptive parameter set to be encoded.

In comparison with the former, the latter can freely set the number of classes to be used, thereby increasing an image quality improving effect. On the other hand, since the latter encodes the number of classes, a code amount increases by an amount needed therefor.

In the adaptive filtering process, the class classification and filter design/filtering process may be performed on each fixed size block, e.g. the largest coding block, instead of being performed on a whole image.

That is, a fixed size block may be class classified, according to local characteristics (scatter, etc.) of an image, for each of a plurality of partitioned small blocks, filter design and a filtering process may be performed for each class, and thus a filter of each class may be encoded, for each fixed size block, as a part of the adaptive parameter set.

By employing this way, a filtering process with higher accuracy according to the local characteristics can be realized, compared to a case in which the class classification and filter design/filtering process are performed on a whole image.

Because a video signal is necessary to be referred to by the loop filter unit 11 when carrying out the pixel adaptive offset process and the adaptive filtering process, the video encoding device shown in FIG. 1 needs to be modified so that the video signal is inputted to the loop filter unit 11.

The motion-compensated prediction frame memory 12 is a recording medium for storing the local decoding image on which the filtering process is performed by the loop filter unit 11.

The variable length encoding unit 13 variable-length-encodes the compressed data outputted from the transformation/quantization unit 7, the output signal from the encoding controlling unit 2 (block partitioning information within each largest coding block, coding mode, prediction difference coding parameters, and intra prediction parameter or inter prediction parameter), and the motion vector outputted from the motion-compensated prediction unit 5 (when coding mode is inter coding mode), to generate encoded data.

Figure 3:
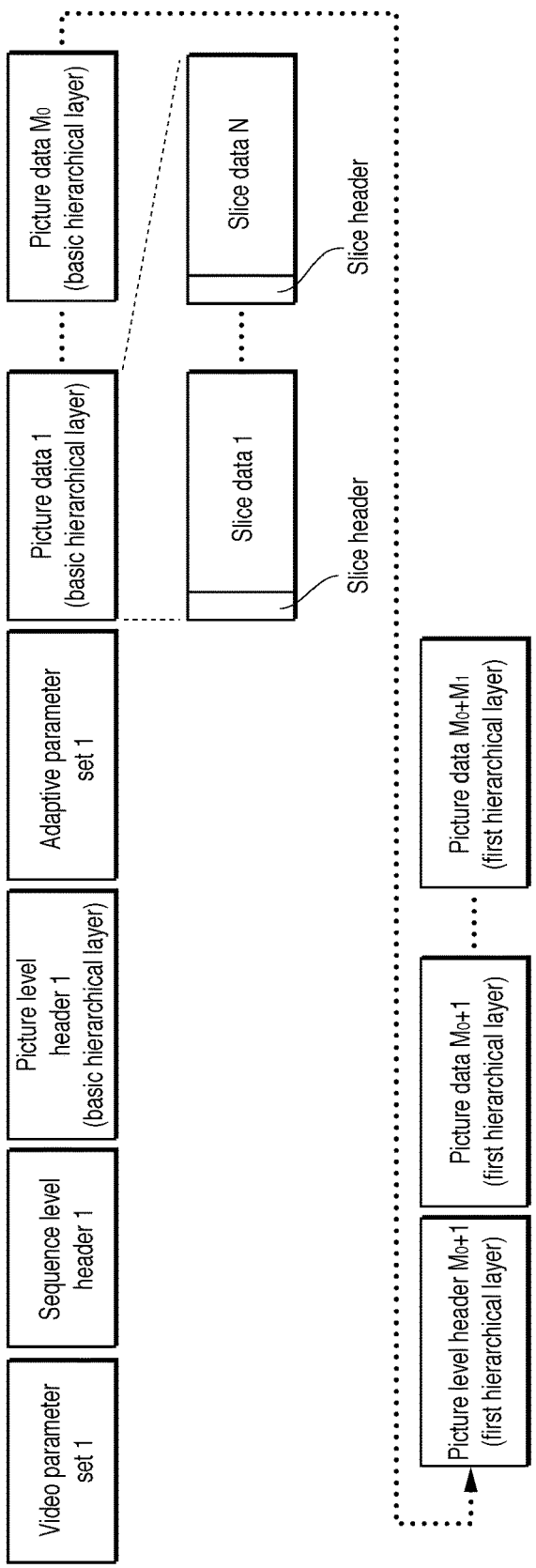
FIG. 3 is an explanatory drawing showing an example of an encoded bitstream in Embodiment 1 of the present invention.

As exemplified in FIG. 3, the variable length encoding unit 13 encodes a video parameter set, a sequence level header, a picture level header, and an adaptive parameter set as header information of an encoded bitstream, and generates an encoded bitstream along with picture data.

The variable length encoding unit 13 constitutes a variable length encoding means.

The picture data is configured with one or more pieces of slice data, and each slice data is acquired by aggregating the slice level header and the above-described encoded data contained in the slice.

The sequence level header is acquired by aggregating header information which is generally common on a per sequence basis, such as an image size, a color signal format, a bit depth of signal values of a luminance signal and a color difference signal, valid flag information of each filtering process (adaptive filtering process, pixel adaptive offset process, and deblocking filtering process) in the loop filter unit 11 on a per sequence basis, and valid flag information of a quantization matrix.

The picture level header is acquired by aggregating header information which is set on a per picture basis, such as an index of the sequence level header to be referred to, the number of reference pictures at motion compensation, and an initializing flag of an entropy encoding probability table.

The slice level header is acquired by aggregating parameters of each slice, such as positional information showing a position of the slice in a picture, an index showing a picture level header to be referred to, an encoding type of the slice (all intra encoding, inter encoding, etc.), an index of an adaptive parameter set to be used in the slice, and flag information showing whether or not to perform each filtering process (adaptive filtering process, pixel adaptive offset process, and deblocking filtering process) in the loop filter unit 11 using the adaptive parameter set indicated by the above-described index.

Each adaptive parameter set has flags each showing whether or not there exists each of parameters (filter parameters) about the adaptive filtering process, the pixel adaptive offset process, and the deblocking filtering process, and whether or not there exists a parameter (quantization matrix parameter) about the quantization matrix, and is a parameter set only having each parameter whose corresponding flag is "valid". In the adaptive parameter set, there also exists an index (aps_id) for identifying a plurality of adaptive parameter sets multiplexed into the encoded bitstream.

The video parameter set is acquired by aggregating information, about pictures belonging to different hierarchical layers, such as parameters about temporal scalability and other parameters about scalable coding and about multi-view coding. In the video parameter set, there also exists an index (video_parameteter_set_id) for identifying a plurality of video parameter sets multiplexed into the encoded bitstream.

Each encoded data such as the video parameter set, the sequence level header, the picture level header, the adaptive parameter set, and one or more slice data configuring the picture data, constitutes an encoded bitstream on a per unit basis called as a NAL (Network Abstraction Layer) unit.

Figure 4:
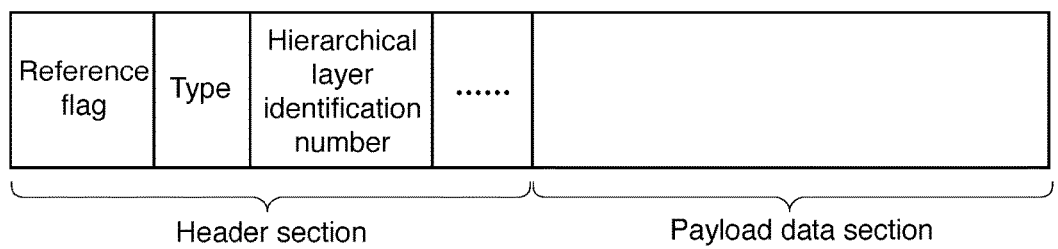
FIG. 4 is an explanatory drawing showing a configuration of a NAL unit in Embodiment 1 of the present invention.

FIG. 4 shows a configuration of the NAL unit. The NAL unit is configured with a header section and a payload data section. The header section includes type information etc., for indicating a type of encoded data in the payload data section, i.e. encoded data of any one of the video parameter set, sequence level header, picture level header, adaptive parameter set, or slice data. Encoded data having a type indicated by the type information is included in the payload data section. A reference flag, a hierarchical layer identification number, and the like, in addition to the type information are included in the header section. The reference flag is a flag for showing, when encoded data included in payload data is slice data, whether or not a frame acquired by decoding the slice data is a frame which is referred to by other frames. The hierarchical layer identification number is a number for showing, when video data is time hierarchically encoded, which hierarchical layer the encoded data relates to. When, for example, encoded data is slice data and its slice is slice data of a frame belonging to a basic hierarchical layer, the encoded data relates to the basic hierarchical layer and thus "0" which shows the basic hierarchical layer is assigned to the hierarchical layer identification number when encoding.

In the example shown in FIG. 1, the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the memory 10 for intra prediction, the loop filter unit 11, the motion-compensated prediction frame memory 12, and the variable length encoding unit 13, which are the components of the video encoding device, each are assumed to be configured with pieces of hardware for exclusive use (e.g., semiconductor integrated circuits in each of which a CPU is mounted, one chip microcomputers, or the like). As an alternative, when the video encoding device is configured with a computer, a program in which the processes carried out by the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the loop filter unit 11, and the variable length encoding unit 13 are described may be stored in a memory of the computer and a CPU of the computer may execute the program stored in the memory.

Figure 5:
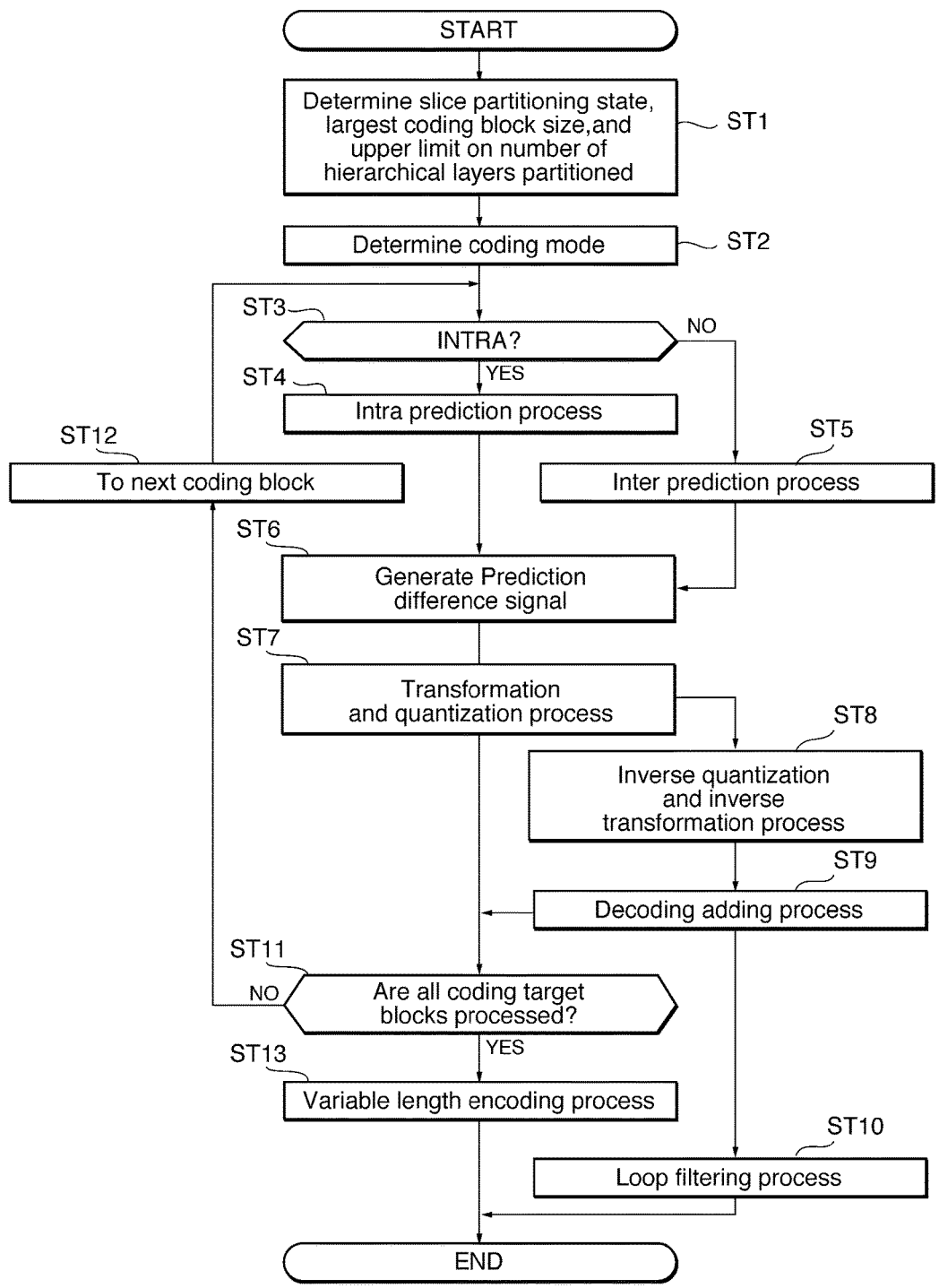
FIG. 5 is a flow chart showing processing (video encoding method) carried out by the video encoding device in accordance with Embodiment 1 of the present invention.

FIG. 5 is a flow chart showing the processing (video encoding method) carried out by the video encoding device in accordance with Embodiment 1 of the present invention.

Figure 6:
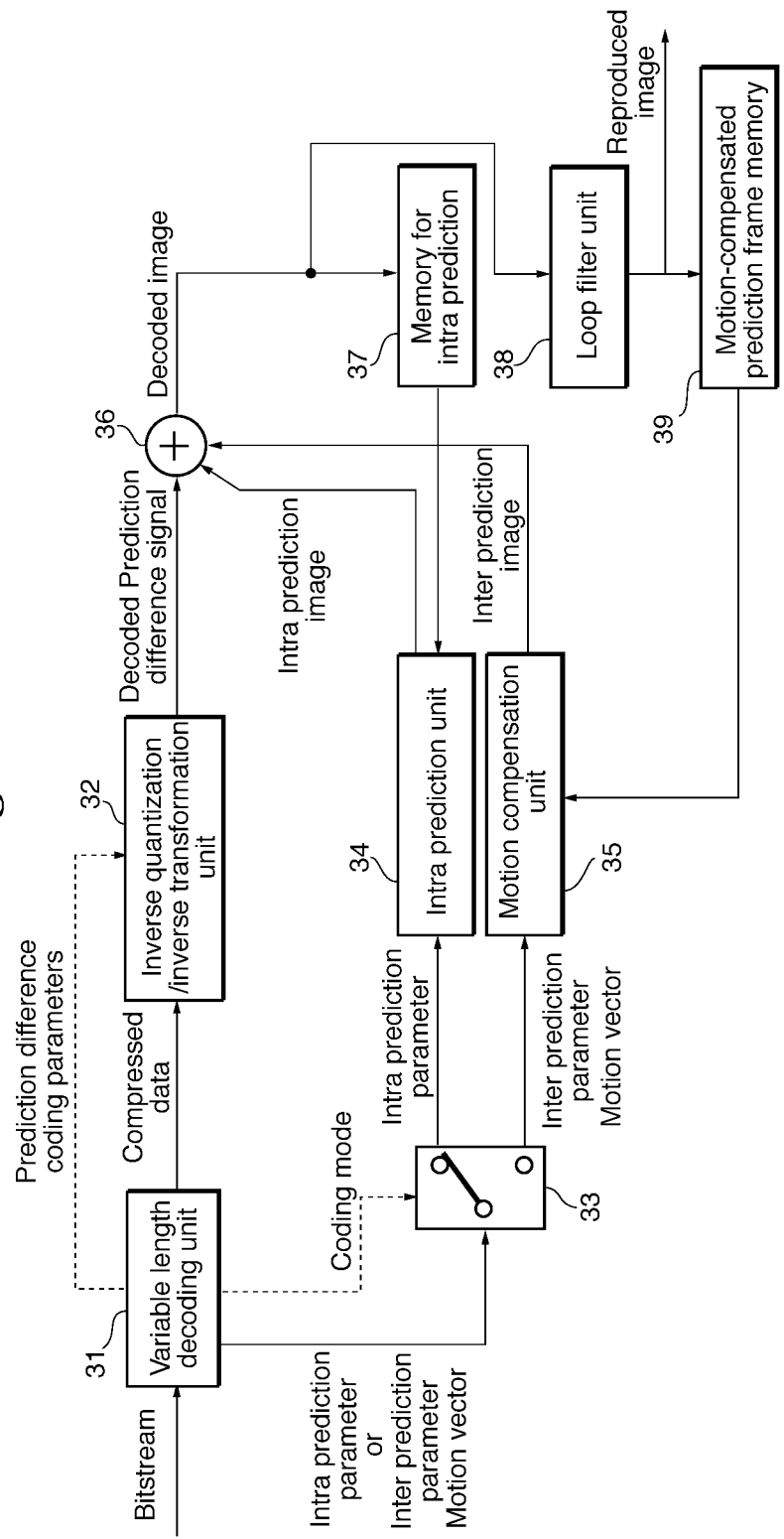
FIG. 6 is a block diagram showing a video decoding device in accordance with Embodiment 1 of the present invention.

FIG. 6 is a block diagram showing a video decoding device in accordance with Embodiment 1 of the present invention. Referring to FIG. 6, when receiving an encoded bitstream generated by the video encoding device shown in FIG. 1, a variable length decoding unit 31 decodes, from the bitstream on a per NAL unit basis, header information such as the video parameter set, sequence level header, picture level header, adaptive parameter set, and slice level header, and also variable-length-decodes, from the bitstream, the block partitioning information indicating a partitioning state of each coding block partitioned hierarchically.

At that time, a quantization matrix of the adaptive parameter set is specified from the quantization matrix parameter in the adaptive parameter set which is variable-length-decoded by the variable length decoding unit 31. Concretely, for each color signal and coding mode on each orthogonal transformation size, when the quantization matrix parameter shows that a quantization matrix prepared, as an initial value, in advance commonly in the video encoding device and the video decoding device, or a quantization matrix already decoded (not new quantization matrix) is to be used, a quantization matrix is specified by referring to the index information for specifying one quantization matrix in the matrices included in the above-described adaptive parameter set. When the quantization matrix parameter shows that a new quantization matrix is to be used, a quantization matrix included in the quantization matrix parameter is specified as a quantization matrix to be used.

The variable length decoding unit 31 also carries out a process of referring to the header information to specify each largest decoding block (block corresponding to "largest coding block" in video encoding device shown in FIG. 1) included in slice data, referring to the block partitioning information to specify each decoding block (block corresponding to "coding block" in video encoding device shown in FIG. 1) serving as a unit when each largest decoding block is hierarchically partitioned and a decoding process is performed, and variable-length-decoding the compressed data, the coding mode, the intra prediction parameter (when coding mode is intra coding mode), the inter prediction parameter (when coding mode is inter coding mode), the prediction difference coding parameters, and the motion vector (when coding mode is inter coding mode), which are associated with each decoding block. The variable length decoding unit 31 constitutes a variable length decoding means.

An inverse quantization/inverse transformation unit 32 refers to the quantization parameter and the orthogonal transformation block partitioning information which are included in the prediction difference coding parameters variable-length-decoded by the variable length decoding unit 31, to inverse-quantize, for each orthogonal transformation block, the compressed data variable-length-decoded by the variable length decoding unit 31, carries out an inverse orthogonal transformation process on the transform coefficients which are the compressed data inverse-quantized thereby, and then carries out a process of calculating a decoding prediction difference signal which is the same as the local decoding prediction difference signal outputted from the inverse quantization/inverse transformation unit 8 shown in FIG. 1. The inverse quantization/inverse transformation unit 32 constitutes a difference image generating means.

When header information variable-length-decoded by the variable length decoding unit 31 shows that an inverse quantization process is performed in the slice using a quantization matrix, an inverse quantization process is carried out using a quantization matrix.

Concretely, an inverse quantization process is performed using a quantization matrix of an adaptive parameter set which is specified by the header information and which is referred to by the slice.

A select switch 33 carries out a process of, when the coding mode variable-length-decoded by the variable length decoding unit 31 is the intra coding mode, outputting the intra prediction parameter which is variable-length-decoded by the variable length decoding unit 31, to an intra prediction unit 34, and, when the coding mode variable-length-decoded by the variable length decoding unit 31 is the inter coding mode, outputting the inter prediction parameter and the motion vector which are variable-length-decoded by the variable length decoding unit 31, to a motion compensation unit 35.

The intra prediction unit 34 carries out, when the coding mode associated with the decoding block specified by the block partitioning information variable-length-decoded by the variable length decoding unit 31 is the intra coding mode, an intra prediction process (intra-frame prediction process) using the intra prediction parameter outputted from the select switch 33 on each prediction block serving as a unit for prediction process when performing the prediction process on the decoding block, while referring to a decoded image stored in a memory 37 for intra prediction, and carries out a process of generating an intra prediction image.

The motion compensation unit 35 carries out, when the coding mode associated with the decoding block specified by the block partitioning information variable-length-decoded by the variable length decoding unit 31 is the inter coding mode, an inter prediction process (motion-compensated prediction process) using the motion vector and the inter prediction parameter which are outputted from the select switch 33 on each prediction block serving as a unit for prediction process when performing the prediction process on the above-mentioned decoding block, while referring to a decoded image stored in a motion-compensated prediction frame memory 39, and carries out a process of generating an inter prediction image.

The intra prediction unit 34, the memory 37 for intra prediction, the motion compensation unit 35, and the motion-compensated prediction frame memory 39 constitutes a predicting means.

An adding unit 36 carries out a process of adding the decoding prediction difference signal calculated by the inverse quantization/inverse transformation unit 32 and the intra prediction image generated by the intra prediction unit 34 or the inter prediction image generated by the motion compensation unit 35, to calculate a decoded image which is the same as the local decoding image outputted from the adding unit 9 shown in FIG. 1. The adding unit 36 constitutes a decoded image generating means.

The memory 37 for intra prediction is a recording medium for storing the decoded image calculated by the adding unit 36.

A loop filter unit 38 carries out a predetermined filtering process on the decoded image calculated by the adding unit 36, and carries out a process of outputting the decoded image filtering-processed thereby.

Concretely, the loop filter unit performs a filtering (deblocking filtering) process of reducing distortion occurring at a boundary between orthogonal transformation blocks and at a boundary between prediction blocks, a process (pixel adaptive offset process) of adaptively adding an offset on a per pixel basis, an adaptive filtering process of adaptively switching among linear filters, such as Wiener filters, to perform the filtering process, and so on.

On each of the above-described deblocking filtering process, pixel adaptive offset process, and adaptive filtering process, the loop filter unit 38 specifies whether or not to perform each process on the slice by referring to header information variable-length-decoded by the variable length decoding unit 31.

In the video encoding device shown in FIG. 1, not when a filter parameter used in the loop filter unit 38 is encoded as a part of an adaptive parameter set which is one of the header information, but when each slice parameter used on a per slice basis is directly encoded by slice data, the variable length decoding unit 31 decodes a filter parameter, from the slice data, which is used in the loop filter unit 38.

Figure 7:
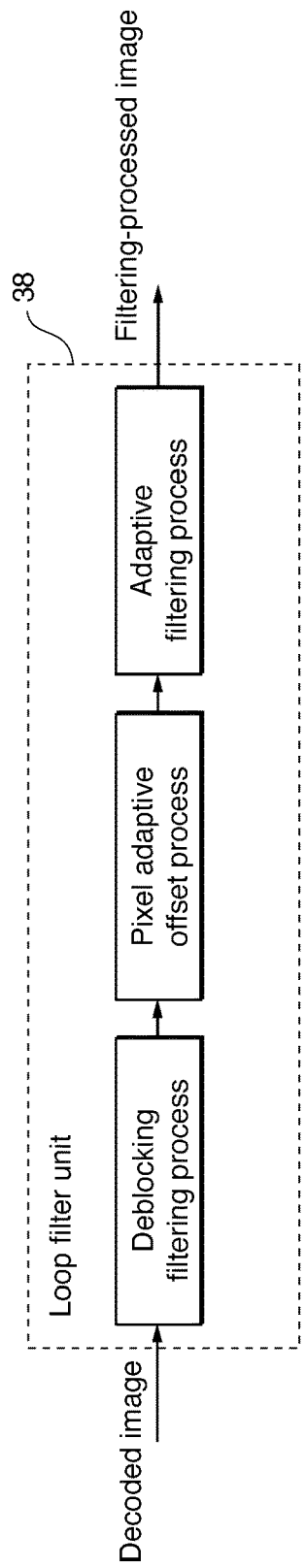
FIG. 7 is an explanatory drawing showing an example of a configuration of using a plurality of loop filtering processes in a loop filter unit of the video decoding device in accordance with Embodiment 1 of the present invention.

At that time, when two or more filtering processes are performed, if the loop filter unit 11 of the video encoding device has the configuration shown in FIG. 2, the loop filter unit 38 has the configuration shown in FIG. 7.

The loop filter unit 38 constitutes a filtering means.

In the deblocking filtering process, an adaptive parameter set which is referred to by the slice is referred to, and, when there exists information indicating that various parameters to be used for selecting the intensity of the filter applied to a block boundary are changed from the initial values, a deblocking filtering process is performed on the basis of the information of changing. If there exists no information of changing, the process is performed according to a predetermined method.

In the pixel adaptive offset process, an adaptive parameter set which is referred to by the slice is referred to, a decoded image is partitioned on the basis of block partitioning information included in the adaptive parameter set, and an index which is included in the adaptive parameter set and which indicates a class classifying method for each of the blocks is referred to for each block. When the index is not an index showing "not performing offset process", each pixel in the block is class classified on a per block basis according to the class classifying method indicated by the above-mentioned index.

As a candidate for the class classifying method, a method same as a candidate for the class classifying method for the pixel adaptive offset process in the loop filter unit 11 is prepared in advance.

A process in which an offset is added to a luminance value of the decoded image is performed by referring to offset information (offset information included in adaptive parameter set) for specifying an offset value of each class on a per block basis.

When a procedure is employed, in a pixel adaptive offset process in the loop filter unit 11 of the video encoding device, in which block partitioning information is not encoded, an image is always partitioned into blocks each having a fixed size (e.g. on a per largest coding block basis), a class classifying method is selected for each of the blocks, and an adaptive offset process is performed on a per class basis, a pixel adaptive offset process is performed also in the loop filter unit 38 for each block having a fixed size same as that in the loop filter unit 11.

In the adaptive filtering process, an adaptive parameter set which is referred to by the slice is referred to, a class classification is performed, using a filter for each class included in the adaptive parameter set, with a method same as that in the video encoding device shown in FIG. 1, and then a filtering process is performed on the basis of the class classifying information.

When a procedure in employed, in an adaptive filtering process in the loop filter unit 11 of the video encoding device, in which the above-described class classification and filter design/filtering process are performed not on a whole image but, for example, for each block having a fixed size such as a largest coding block, the above-described class classification and filtering process are performed, by decoding filters used in each class, also in the loop filter unit 38 for each block having a fixed size same as that in the loop filter unit 11.

The motion-compensated prediction frame memory 39 is a recording medium for storing the decoded image on which the filtering process is carried out by the loop filter unit 38.

In the example shown in FIG. 6, the variable length decoding unit 31, the inverse quantization/inverse transformation unit 32, the select switch 33, the intra prediction unit 34, the motion compensation unit 35, the adding unit 36, the memory 37 for intra prediction, the loop filter unit 38, and the motion-compensated prediction frame memory 39, which are the components of the video decoding device, each are assumed to be configured with pieces of hardware for exclusive use (e.g., semiconductor integrated circuits in each of which a CPU is mounted, one chip microcomputers, or the like). As an alternative, when the video decoding device is configured with a computer, a program in which the processes carried out by the variable length decoding unit 31, the inverse quantization/inverse transformation unit 32, the select switch 33, the intra prediction unit 34, the motion compensation unit 35, the adding unit 36, and the loop filter unit 38 are described may be stored in a memory of the computer and a CPU of the computer may execute the program stored in the memory.

Figure 8:
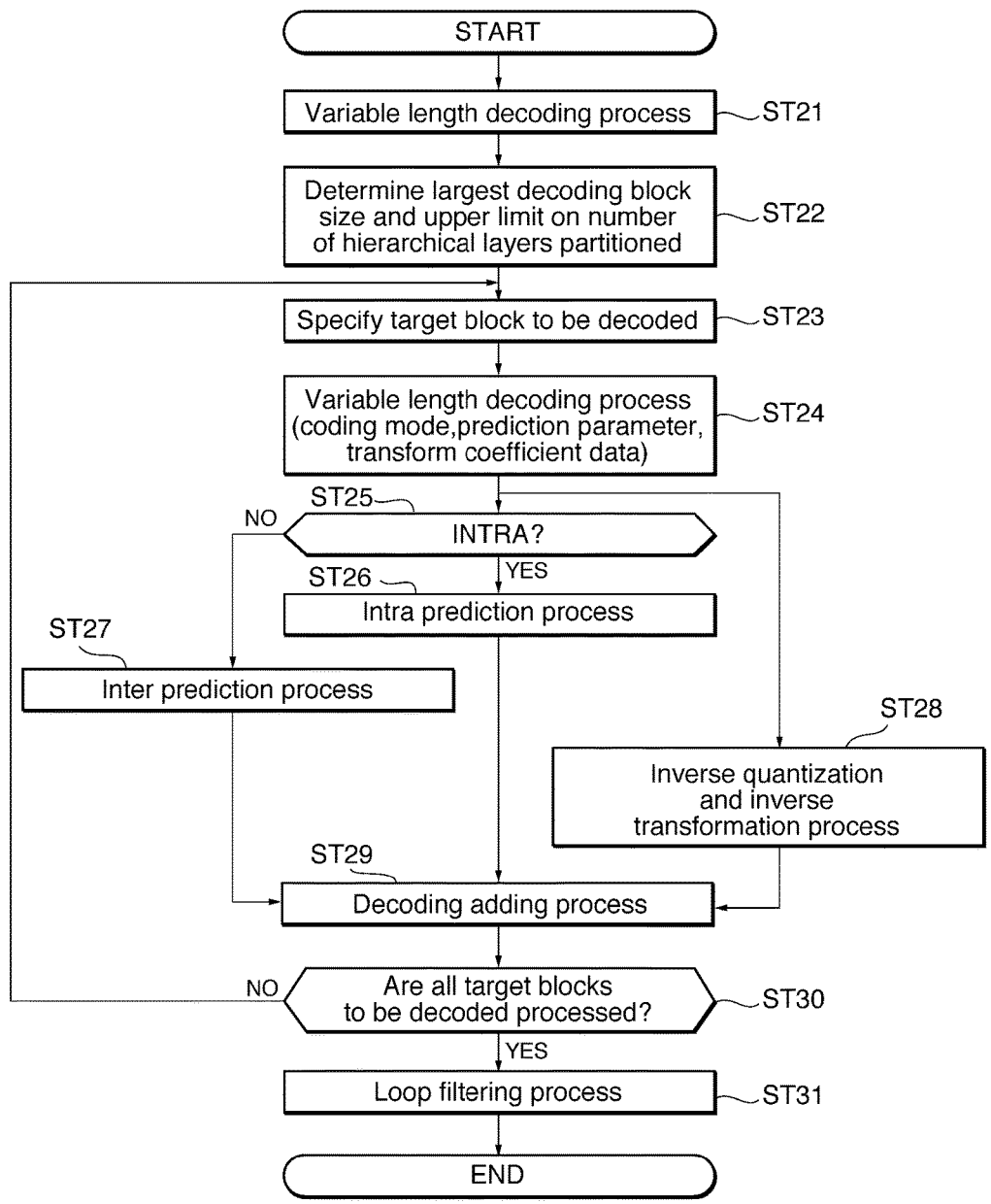
FIG. 8 is a flow chart showing processing (video decoding method) carried out by the video decoding device in accordance with Embodiment 1 of the present invention.

FIG. 8 is a flow chart showing the processing (video decoding method) carried out by the video decoding device in accordance with Embodiment 1 of the present invention.

Next, operations will be explained.

In Embodiment 1, the following case will be explained. That is, the video encoding device receives each frame of a video as an input image, carries out an intra prediction on the basis of already-encoded neighboring pixels or a motion-compensated prediction between adjacent frames, performs a compression process with orthogonal transformation and quantization on an acquired prediction difference signal, and after that, carries out variable length encoding to generate an encoded bitstream, and the video decoding device decodes the encoded bitstream outputted from the video encoding device.

The video encoding device shown in FIG. 1 is characterized in that the device is adapted for local changes of a video signal in a space direction and in a time direction, partitions the video signal into blocks having various sizes, and carries out intra-frame and inter-frame adaptive encoding.

In general, video signals have characteristics of their complexity locally varying in space and time. There may be a case in which, from the viewpoint of space, a pattern having a uniform signal characteristic in a relatively large image region, such as a sky image or a wall image, and a pattern having a complicated texture pattern in a small image region, such as a person image or a painting including a fine texture, coexist on a certain video frame, for example.

Also from the viewpoint of time, while a sky image and a wall image have a small local change in a time direction in their patterns, an image of a moving person or an object has a large temporal change because its outline moves as a rigid/non-rigid body with respect to time.

Although a process of generating a prediction difference signal having small signal power and small entropy by using a temporal and spatial prediction, thereby reducing the whole code amount, is carried out in the encoding process, the code amount of parameters used for the prediction can be reduced if the parameters can be applied uniformly to as large an image signal region as possible.

On the other hand, because the amount of errors occurring in the prediction increases when the same prediction parameter is applied to a large image region in an image signal pattern having a large change in time and space, the code amount of the prediction difference signal increases.

Therefore, it is desirable that, for an image region having a large change in time and space, the size of a block subjected to the prediction process to which the same prediction parameter is applied is reduced, thereby increasing the data volume of the parameter which is used for the prediction and reducing the electric power and entropy of the prediction difference signal.

In Embodiment 1, in order to carry out encoding which is adapted for the above-described general characteristics of a video signal, a configuration is employed in which the prediction process and so on first start from a predetermined largest block size, the region of the video signal is hierarchically partitioned, and the prediction process and the encoding process of the prediction difference are adapted to each of the partitioned regions.

A format of a video signal to be processed by the video encoding device shown in FIG. 1 is assumed to be an arbitrary video signal in which each video frame consists of a series of digital samples (pixels) in two dimensions, horizontal and vertical, including a color video signal in arbitrary color space such as a YUV signal which consists of a luminance signal and two color difference signals and an RGB signal outputted from a digital image sensor, a monochrome image signal, an infrared image signal, and so on.

The gradation of each pixel can be an 8-bit, 10-bit, or 12-bit one.

In the following explanation, for convenience' sake, the video signal of the inputted image is assumed to be, unless otherwise specified, a YUV signal and a case of handling signals having a 4:2:0 format in which two color difference components U and V are subsampled with respect to the luminance component Y, will be described.

Further, a data unit to be processed which corresponds to each frame of the video signal is referred to as a "picture."

In Embodiment 1, although an explanation will be made in which a "picture" is a video frame signal on which progressive scanning is carried out, a "picture" may be alternatively a field image signal which is a unit constituting a video frame when the video signal is an interlaced signal.

The processing carried out by the video encoding device shown in FIG. 1 will be explained first.

Figure 24:
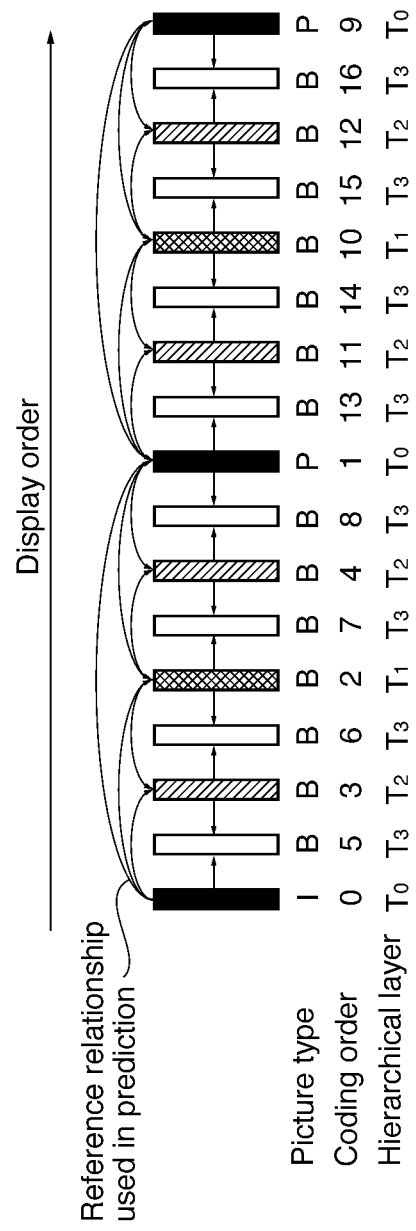
FIG. 24 is an explanatory drawing showing an example of conventional video data which is time hierarchically encoded.
Figure 25:
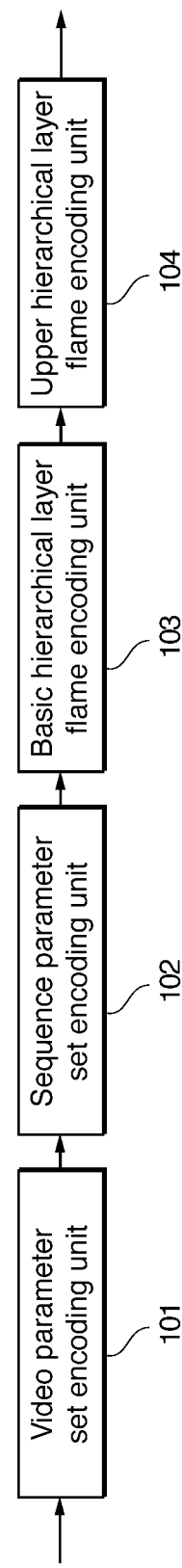
FIG. 25 is a block diagram showing a configuration of a conventional video encoding device for generating video data which is time hierarchically encoded.

First, the encoding controlling unit 2 determines a GOP (Group Of Picture) structure such as a picture type, a coding order, and a reference relationship of pictures used in a prediction, about pictures in a sequence. Encoding processing will be explained by taking a case as an example, in which temporal scalability is employed in the GOP structure shown in FIG. 24.

In the encoding controlling unit 2, the picture type of a first picture is set as an I picture (I0 picture), and the picture type of a picture to be encoded next is set as a P picture (P1 picture). The P1 picture is prediction encoded by only referring to the I0 picture. The I0 picture and the P1 picture are assumed to be pictures belonging to a basic hierarchical layer (T0).

The picture type of a picture to be encoded after the P1 picture is set as a B picture (B2 picture), and the B2 picture is assumed to be a picture belonging to a first hierarchical layer (T1). The B2 picture is prediction encoded by referring to a picture belonging to the basic hierarchical layer or the first hierarchical layer. In the example shown in FIG. 24, prediction encoding is performed by referring to the I0 picture and the P1 picture.

The picture type of a picture to be encoded after the B2 picture is set as a B picture (B3 picture), and the B3 picture is assumed to be a picture belonging to a second hierarchical layer (T2). A picture to be encoded after the B3 picture (B4 picture) is assumed to be also belonging to the second hierarchical layer (T2).

A picture belonging to the second hierarchical layer (T2) is prediction encoded by referring to pictures belonging to the basic hierarchical layer through the second hierarchical layer.

After encoding the B4 picture, a B5 picture, a B6 picture, a B7 picture, and a B8 picture are encoded in this order. The B5 picture through the B8 picture are assumed to be pictures belonging to a third hierarchical layer (T3), and are prediction encoded by referring to pictures belonging to the basic hierarchical layer through the third hierarchical layer.

Subsequently, pictures belonging to the basic hierarchical layer are set every nine pictures and eight pictures between two basic hierarchical layers are encoded with dividing them into three hierarchical layers, i.e. the second hierarchical layer through the fourth hierarchical layer.

When the temporal scalability is employed in the above-described GOP structure, pictures only belonging to the basic hierarchical layer can be correctly decoded by the video decoding device. Similarly, there may be a case in which pictures only belonging to the basic hierarchical layer and pictures only belonging to the second hierarchical layer can be correctly decoded. That is, the video decoding device can perform decoding in a scalable manner. The encoding controlling unit 2 sets a value (e.g. 1), indicating that the temporal scalability is employed, to a flag indicating whether or not the temporal scalability is employed, and outputs the value to the variable length encoding unit. When the temporal scalability is not employed in the GOP structure, the encoding controlling unit sets a value (e.g. 0), indicating that the temporal scalability is not employed, to the flag indicating whether or not the temporal scalability is employed, and outputs the value to the variable length encoding unit.

Then, the encoding controlling unit 2 outputs, to the variable length encoding unit, information such as the maximum number of hierarchical layers and a picture buffer size necessary for each hierarchical layer. In the example shown in FIG. 24, the maximum number of hierarchical layers is four, and the picture buffer size necessary for each hierarchical layer is determined by the number of frames to be referred to and the number of buffered pictures necessary for sorting the pictures belonging to each of the hierarchical layers in their display order.

Next, the encoding controlling unit 2 determines a slice partitioning state of a picture (current picture) which is the target to be encoded, a size of each largest coding block used for the encoding of the picture, and an upper limit on the number of hierarchical layers into which each largest coding block is hierarchically partitioned (step ST1 in FIG. 5).

As a method of determining the size of each largest coding block, for example, there can be a method of employing the same size for all the pictures according to the resolution of the video signal of the inputted image, and a method of quantifying a variation in the complexity of a local movement of the video signal of the inputted image as a parameter and then employing a small size for a picture having a vigorous movement while employing a large size for a picture having a small movement.

As a method of determining the upper limit on the number of hierarchical layers partitioned, for example, there can be a method of employing the same number of hierarchical layers for all the pictures according to the resolution of the video signal of the inputted image, and a method of employing an increased number of hierarchical layers for the video signal of the inputted image having a vigorous movement so that a finer movement can be detected, while employing a decreased number of hierarchical layers for the video signal of the inputted image having a small movement.

The above-described size of each largest coding block and the upper limit on the number of hierarchical layers into which each largest coding block is hierarchically partitioned may be encoded in the sequence level header, or may not be encoded and the same decision process may be also carried out by the video decoding device. In the former case, the code amount of the header information increases. However, because the video decoding device has no need to carry out the above-described decision process, the processing load of the video decoding device can be decreased and, in addition to that, an optimal value is searched for and sent by the video encoding device. In the latter case, on the other hand, while the processing load of the video decoding device increases since the above-described decision process is carried out by the video decoding device, the code amount of the header information does not increase.

The encoding controlling unit 2 also selects a coding mode corresponding to each of the coding blocks to be hierarchically partitioned, from among one or more available coding modes (step ST2).

More specifically, the encoding controlling unit 2 partitions each image region having the largest coding block size into coding blocks each having a hierarchical coding block size until the upper limit on the number of hierarchical layers partitioned which is determined in advance is reached, and determines a coding mode for each of the coding blocks.

As to the coding mode, there are one or more intra coding modes (generically referred to as "INTRA") and one or more inter coding modes (generically referred to as "INTER"), and the encoding controlling unit 2 selects a coding mode corresponding to each of the coding blocks from among all the coding modes available in the current picture or a subset of these coding modes.

Each of the coding blocks to be hierarchically partitioned by the block partitioning unit 1, which will be mentioned later, is further partitioned into one or more prediction blocks each serving as a unit on which a prediction process is carried out, and a prediction block partitioning state is also included as information in the coding mode. More specifically, the coding mode, which is either of the intra or the inter coding mode, is an index for identifying what kind of partitioned prediction blocks are included. Although a detailed explanation of a method of selecting a coding mode by the encoding controlling unit 2 will be omitted because it is a publicly known technology, there is a method of carrying out an encoding process on each coding block by using arbitrary available coding modes to examine the encoding efficiency, and selecting a coding mode having the highest degree of coding efficiency from among the plurality of available coding modes, for example.

The encoding controlling unit 2 further determines a quantization parameter and an orthogonal transformation block partitioning state, which are used when a difference image is compressed, for each coding block, and also determines a prediction parameter (intra prediction parameter or inter prediction parameter) which is used when a prediction process is carried out.

When each coding block is further partitioned into prediction blocks on each of which the prediction process is carried out, a prediction parameter (intra prediction parameter or inter prediction parameter) can be selected for each of the prediction blocks.

In addition, in a coding block whose coding mode is the intra coding mode, when an intra prediction process is carried out, already-encoded pixels adjacent to the prediction block are used, which will be described later in detail, and thus, it is necessary to carry out encoding on a per prediction block basis. Therefore, selectable transformation block sizes are limited to the size of the prediction block or smaller.

The encoding controlling unit 2 outputs prediction difference coding parameters including the quantization parameter and the transformation block size, to the transformation/quantization unit 7, the inverse quantization/inverse transformation unit 8, and the variable length encoding unit 13.

The encoding controlling unit 2 also outputs the intra prediction parameter to the intra prediction unit 4 as needed.

The encoding controlling unit 2 further outputs the inter prediction parameter to the motion-compensated prediction unit 5 as needed.

When receiving a video signal as an inputted image, the slice partitioning unit 14 partitions the inputted image into one or more slices which are partial images, according to the slice partitioning information determined by the encoding controlling unit 2.

When receiving each slice from the slice partitioning unit 14, the block partitioning unit 1 partitions the inputted slice into coding blocks each having the largest coding block size determined by the encoding controlling unit 2, and further partitions hierarchically each of the partitioned largest coding blocks into coding blocks determined by the encoding controlling unit 2, and outputs the coding blocks.

Figure 9:
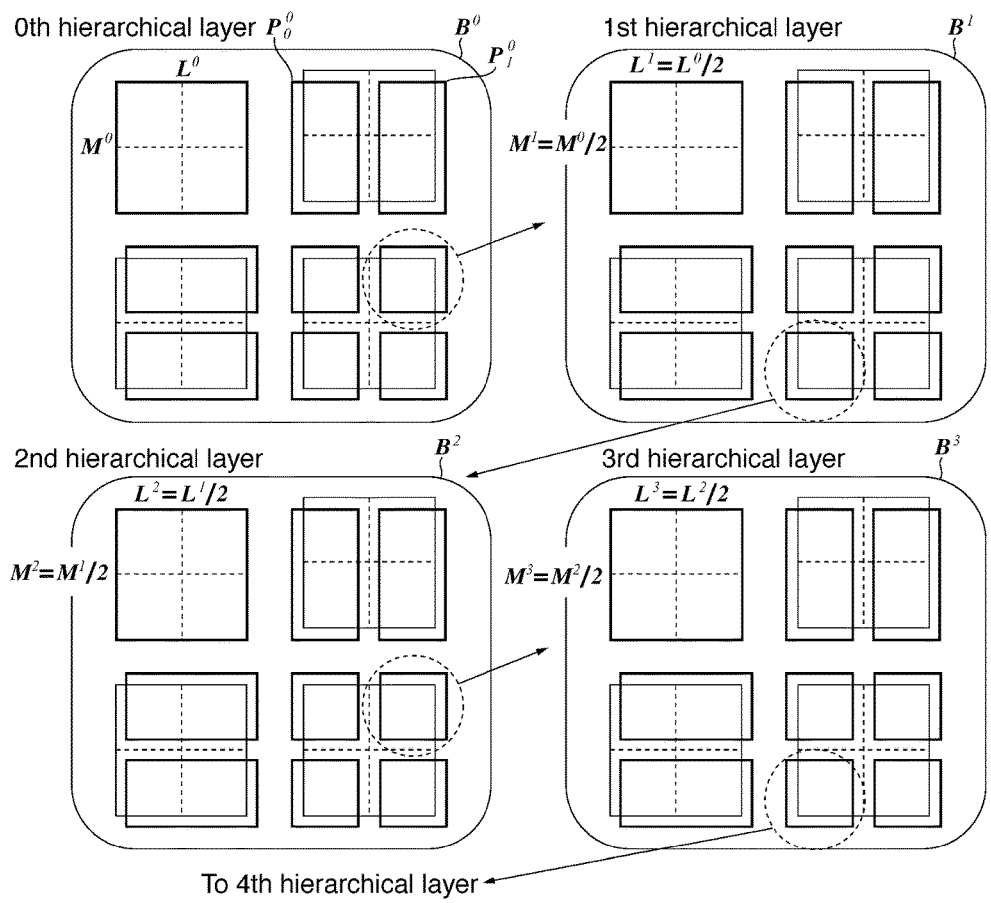
FIG. 9 is an explanatory drawing showing an example in which each largest coding block is partitioned hierarchically into a plurality of coding blocks.

FIG. 9 is an explanatory drawing showing an example in which each largest coding block is hierarchically partitioned into a plurality of coding blocks.

Referring to FIG. 9, each largest coding block is a coding block on "0-th hierarchical layer", whose luminance component has a size of ($L^0$, $M^0$).

By carrying out the hierarchical partitioning, according to a quadtree structure, with each largest coding block being set as a starting point until the depth reaches a predetermined value which is set separately, the coding blocks can be acquired.

At the depth of n, each coding block is an image region having a size of ($L^n$, $M^n$).

Although $L^n$ may be the same as or differ from $M^n$, a case of $L^n=M^n$ is shown in FIG. 9.

Hereafter, the coding block size determined by the encoding controlling unit 2 is defined as the size of ($L^n$, $M^n$) in the luminance component of each coding block.

Because quadtree partitioning is carried out, ($L^{n+1}$, $M^{n+1}$) = ($L^n/2$, $M^n/2$) is always established.

In a case of a color video image signal (4:4:4 format) in which all the color components have the same sample number, such as an RGB signal, all the color components have the size of ($L''$, $M''$). In a case of handling a 4:2:0 format, a corresponding color difference component has a coding block size of ($L''/2$, $M''/2$).

Hereafter, each coding block in the n-th hierarchical layer is expressed as $B^n$, and a coding mode selectable for each coding block $B^n$ is expressed as $m(B^n)$.

In a case of a color video signal which consists of a plurality of color components, the coding mode $m(B^n)$ may be configured to use an individual mode for each color component, or to use a common mode for all the color components. Hereafter, explanations will be made by assuming that the coding mode indicates one for the luminance component of a coding block of a YUV signal having a 4:2:0 format, unless otherwise specified.

As shown in FIG. 9, each coding block $B^n$ is partitioned into one or more prediction blocks, each showing a unit for prediction process, by the block partitioning unit 1.

Hereafter, each prediction block belonging to each coding block $B^n$ is expressed as $P_i^n$ (i shows prediction block number in n-th hierarchical layer). Examples of $P_0^0$ and $P_1^0$ are shown in FIG. 9.

How the prediction block partitioning is carried out in each coding block $B^n$ is included as information in the coding mode $m(B^n)$.

While a prediction process is carried out on each of all the prediction blocks $P_i^n$ according to the coding mode $m(B^n)$, an individual prediction parameter (intra prediction parameter or inter prediction parameter) can be selected for each prediction block $P_i^n$.

Figure 10:
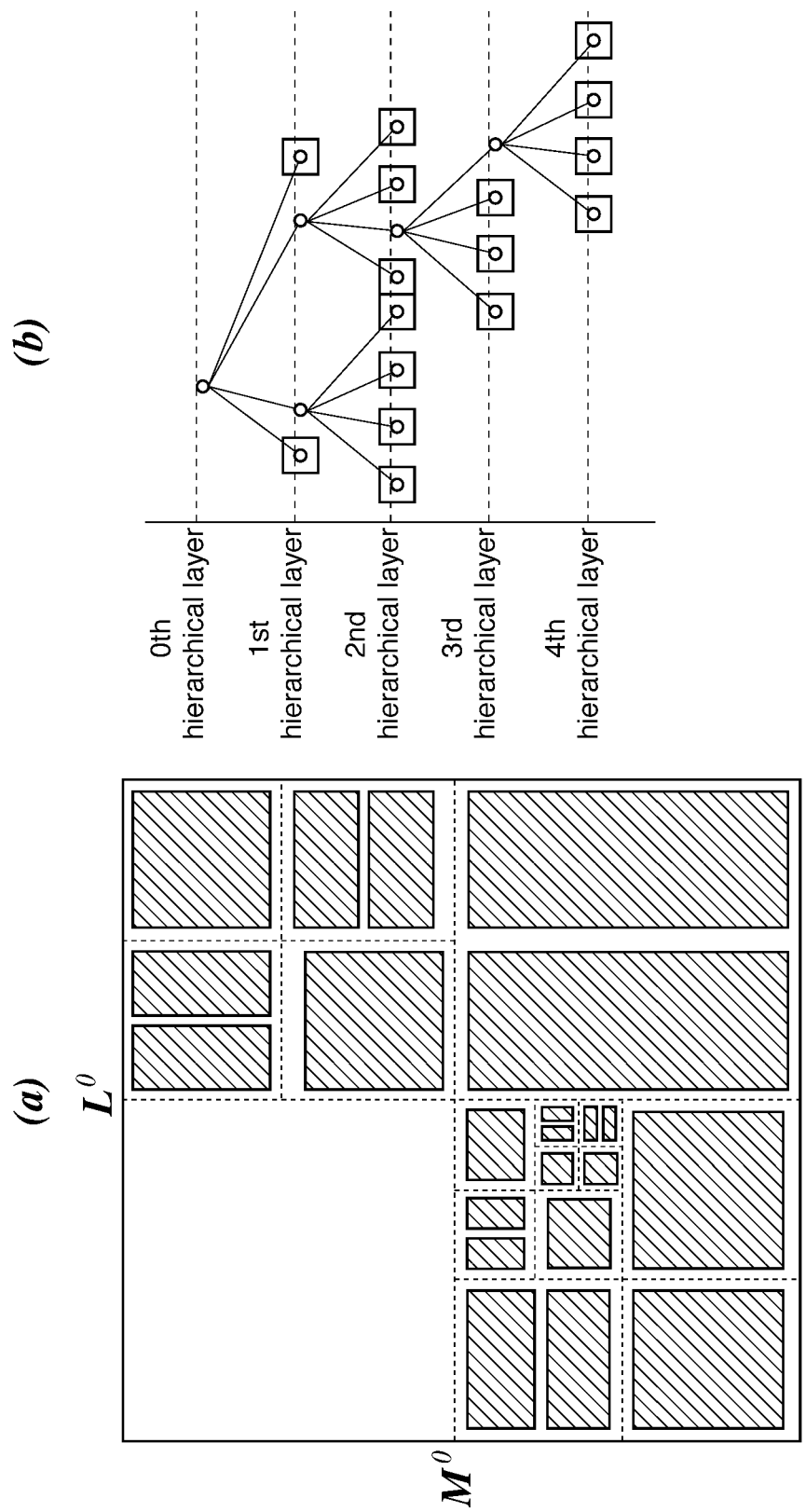
FIG. 10(*a*) is an explanatory drawing showing a distribution of coding blocks and prediction blocks after partitioning, and FIG. 10(*b*) is an explanatory drawing showing a state in which a coding mode m(B$^n$) is assigned through hierarchical layer partitioning.

The encoding controlling unit 2 generates a block partitioning state such as the one shown in FIG. 10 for each largest coding block, and then specifies coding blocks.

Each rectangle enclosed by a dotted line in FIG. 10(a) shows a coding block, and each block filled with hatch lines in each coding block shows the partitioning state of each prediction block.

FIG. 10(b) shows, by using a quadtree graph, a situation to which a coding mode $m(B^n)$ is assigned through the hierarchical layer partitioning in the example shown in FIG. 10(a). Each node enclosed by □ in FIG. 10(b) is a node (coding block) to which a coding mode $m(B^n)$ is assigned.

Information about this quadtree graph is outputted, together with the coding mode $m(Bn)$, from the encoding controlling unit 2 to the variable length encoding unit 13, and is multiplexed into a bitstream.

When the coding mode $m(B^n)$ determined by the encoding controlling unit 2 is the intra coding mode (in a case of $m(B^n) \in INTRA$), the select switch 3 outputs the coding block $B^n$, outputted from the block partitioning unit 1, to the intra prediction unit 4.

In contrast, when the coding mode $m(B^n)$ determined by the encoding controlling unit 2 is the inter coding mode (in a case of $m(B^n) \in INTER$), the select switch outputs the coding block $B^n$, outputted from the block partitioning unit 1, to the motion-compensated prediction unit 5.

When the coding mode $m(B^n)$ determined by the encoding controlling unit 2 is the intra coding mode (in a case of $m(B^n) \in INTRA$), on receiving the coding block $B^n$ from the select switch 3 (step ST3), the intra prediction unit 4 carries out the intra prediction process on each prediction block $P_i^n$ in the coding block $B^n$ by using the intra prediction parameter determined by the encoding controlling unit 2 while referring to the local decoding image stored in the memory 10 for intra prediction, to generate an intra prediction image $P_{INTRAi}^n$ (step ST4).

Because the video decoding device needs to generate an intra prediction image which is completely the same as the intra prediction image $P_{INTRAi}^n$, the intra prediction parameter used for generating the intra prediction image $P_{INTRAi}^n$ is outputted from the encoding controlling unit 2 to the variable length encoding unit 13, and is multiplexed into the bitstream.

The details of the processing carried out by the intra prediction unit 4 will be mentioned later.

When the coding mode $m(B^n)$ determined by the encoding controlling unit 2 is the inter coding mode (in a case of $m(B^n) \in INTER$), on receiving the coding block $B^n$ from the select switch 3 (step ST3), the motion-compensated prediction unit 5 compares each prediction block $P_i^n$ in the coding block Bn with the local decoding image which is stored in the motion-compensated prediction frame memory 12 and on which the filtering process is performed, to search for a motion vector, and carries out the inter prediction process on each prediction block $P_i^n$ in the coding block $B^n$ by using the motion vector and the inter prediction parameter determined by the encoding controlling unit 2, to generate an inter prediction image $P_{INTERi}^n$ (step ST5).

Because the video decoding device needs to generate an inter prediction image which is completely the same as the inter prediction image $P_{INTERi}^n$, the inter prediction parameter used for generating the inter prediction image $P_{INTERi}^n$ is outputted from the encoding controlling unit 2 to the variable length encoding unit 13, and is multiplexed into the bitstream.

The motion vector which is searched for by the motion-compensated prediction unit 5 is also outputted to the variable length encoding unit 13, and is multiplexed into the bitstream.

When receiving the coding block $B^n$ from the block partitioning unit 1, the subtracting unit 6 subtracts either one of the intra prediction image $P_{INTRAi}^n$ generated by the intra prediction unit 4 or the inter prediction image $P_{INTERi}^n$ generated by the motion-compensated prediction unit 5, from the prediction block $P_i^n$ in the coding block $B^n$, and outputs a prediction difference signal $e_i^n$ showing a difference image which is the result of the subtraction, to the transformation/quantization unit 7 (step ST6).

When receiving the prediction difference signal $e_i^n$ from the subtracting unit 6, the transformation/quantization unit 7 refers to the orthogonal transformation block partitioning information included in the prediction difference coding parameters determined by the encoding controlling unit 2, and carries out an orthogonal transformation process (e.g., orthogonal transformation process, such as DCT (discrete cosine transform), DST (discrete sine transform), and KL transform in which bases are designed for specific learning sequence in advance) on the prediction difference signal $e_i^n$ on a per orthogonal transformation block basis, to calculate transform coefficients.

The transformation/quantization unit 7 also refers to the quantization parameter included in the prediction difference coding parameters, to quantize the transform coefficients of each orthogonal transformation block, and outputs compressed data which are the transform coefficients quantized thereby, to the inverse quantization/inverse transformation unit 8 and the variable length encoding unit 13 (step ST7). At that time, the quantization process may be carried out by using a quantization matrix for scaling, for each of the transform coefficients, the quantization step size calculated from the above-described quantization parameter.

When receiving the compressed data from the transformation/quantization unit 7, the inverse quantization/inverse transformation unit 8 refers to the quantization parameter and the orthogonal transformation block partitioning information which are included in the prediction difference coding parameters determined by the encoding controlling unit 2, to inverse-quantize the compressed data on a per orthogonal transformation block basis.

When the transformation/quantization unit 7 carries out a quantization process by using a quantization matrix, a corresponding inverse quantization process is carried out, by referring to the quantization matrix, also in the inverse quantization process.

The inverse quantization/inverse transformation unit 8 carries out an inverse orthogonal transformation process (e.g., inverse DCT, inverse DST, inverse KL transform, or the like) on the transform coefficients which are the compressed data inverse-quantized thereby on a per orthogonal transformation block basis, and calculates a local decoding prediction difference signal corresponding to the prediction difference signal $e_i''$ outputted from the subtracting unit 6, to be outputted to the adding unit 9 (step ST8).

When receiving the local decoding prediction difference signal from the inverse quantization/inverse transformation unit 8, the adding unit 9 adds the local decoding prediction difference signal and either one of the intra prediction image $P_{INTRAi}''$ generated by the intra prediction unit 4 or the inter prediction image $P_{INTERi}''$ generated by the motion-compensated prediction unit 5, and thus calculates a local decoding image (step ST9).

The adding unit 9 outputs the local decoding image to the loop filter unit 11, while storing the local decoding image in the memory 10 for intra prediction.

This local decoding image will be employed as an already-encoded image signal which is used in subsequent intra prediction processes.

When receiving the local decoding image from the adding unit 9, the loop filter unit 11 carries out the predetermined filtering process on the local decoding image, and stores the local decoding image filtering-processed thereby in the motion-compensated prediction frame memory 12 (step ST10).

Concretely, the loop filter unit performs a filtering (deblocking filtering) process of reducing distortion occurring at a boundary between orthogonal transformation blocks and at a boundary between prediction blocks, a process (pixel adaptive offset process) of adaptively adding an offset on a per pixel basis, an adaptive filtering process of adaptively switching among linear filters, such as Wiener filters, to perform the filtering process, and so on.

The loop filter unit 11 determines whether or not to perform each of the above-mentioned deblocking filtering process, pixel adaptive offset process, and adaptive filtering process, and outputs a valid flag of each process, as a part of the adaptive parameter set and a part of a slice level header which are to be encoded, to the variable length encoding unit 13. When a plurality of above-mentioned filtering processes are used, the filtering processes are performed sequentially. FIG. 2 shows an example of a configuration of the loop filter unit 11 when the plurality of filtering processes are used.

In general, although the image quality improves with the increase in the number of types of filtering processes to be used, the processing load increases on the other hand. More specifically, there is a trade-off between the image quality and the processing load. Also, an image quality improving effect of each filtering process differs depending on characteristics of images subjected to the filtering process. Thus, the filtering process to be used can be determined according to the processing load acceptable to the video encoding device and the characteristics of images subjected to the encoding process.

The processes of steps ST3 through ST9 are repeatedly carried out until the processing on all the coding blocks $B''$ which are hierarchically partitioned are completed, and, when completing the processing on all the coding blocks $B''$, it shifts to a process of step ST13 (steps ST11 and ST12).

The variable length encoding unit 13 variable length encodes the compressed data which is outputted from the transformation/quantization unit 7, the block partitioning information of each largest coding block (quadtree information shown in FIG. 10(*b*) as an example) and the coding mode m($B''$) and the prediction difference coding parameters which are outputted from the encoding controlling unit 2, the intra prediction parameter (when coding mode is intra coding mode) or the inter prediction parameter (when coding mode is inter coding mode) which is outputted from the encoding controlling unit 2, and the motion vector which is outputted from the motion-compensated prediction unit 5 (when coding mode is inter coding mode), and generates coding data showing those encoded results (step ST13).

As exemplified in FIG. 3, the variable length encoding unit 13 encodes the video parameter set, sequence level header, picture level header, and adaptive parameter set as the header information of the encoded bitstream, and generates the encoded bitstream along with the picture data.

The picture data is configured with one or more pieces of slice data, and each slice data is acquired by aggregating the slice level header and the above-described encoded data contained in the slice.

The sequence level header is acquired by aggregating header information which is generally common on a per sequence basis, such as an image size, a color signal format, a bit depth of signal values of a luminance signal and a color difference signal, valid flag information of each filtering process (adaptive filtering process, pixel adaptive offset process, and deblocking filtering process) in the loop filter unit 11 on a per sequence basis, and valid flag information of a quantization matrix.

The picture level header is acquired by aggregating header information which is set on a per picture basis, such as an index of the sequence level header to be referred to, the number of reference pictures at motion compensation, and an initializing flag of an entropy encoding probability table.

The slice level header is acquired by aggregating parameters of each slice, such as positional information showing a position of the slice in a picture, an index showing a picture level header to be referred to, an encoding type of a slice (all intra encoding, inter encoding, etc.), an index of an adaptive parameter set to be used in the slice, and flag information showing whether or not to perform each filtering process (adaptive filtering process, pixel adaptive offset process, and deblocking filtering process) in the loop filter unit 11 using the adaptive parameter set indicated by the above-described index.

The adaptive parameter set is a parameter set having parameters (filter parameters) about the adaptive filtering process, pixel adaptive offset process, and deblocking filtering process, and having a parameter (quantization matrix parameter) about the quantization matrix. Each adaptive parameter set has an index (aps_id) for identifying a plurality of adaptive parameter sets multiplexed into the encoded bitstream.

Each adaptive parameter set has flags (present_flag) each showing whether or not there exists each of filter parameters about the adaptive filtering process, pixel adaptive offset process, and deblocking filtering process, and whether or not there exists the quantization matrix parameter, and, if each existence flag is "valid", each adaptive parameter set has the corresponding parameter.

Therefore, whether or not there exists each parameter can be freely set in the adaptive parameter set.

Each slice has, in its slice level header, at least one or more indexes (aps_id) of the adaptive parameter set to be referred to at a decoding process of the slice, and a quantization process, an inverse quantization process, and a loop filtering process are carried out by referring to the corresponding adaptive parameter set.

When an adaptive parameter set is encoded and is multiplexed into an encoded bitstream, if there already exists, in the encoded bitstream, an adaptive parameter set having the same index (aps_id), the adaptive parameter set having the same index is replaced by the above-described adaptive parameter set to be encoded.

Therefore, when encoding a new adaptive parameter set, if an already-encoded adaptive parameter set is not necessary, the encoding is performed by the index of the unnecessary adaptive parameter set. This enables an overwriting update of the adaptive parameter set and avoids the increase of the number of adaptive parameter sets to be stored, and thus reduces the capacity of memories to be used.

Next, the video parameter set will be explained.

In the video parameter set, there are encoded a flag showing whether or not temporal scalability is employed, the maximum number of hierarchical layers, and the picture buffer size of each hierarchical layer, which are outputted from the encoding controlling unit 2.

In the video parameter set, there is also encoded a "basic hierarchical layer existence flag" showing whether or not a basic hierarchical layer is included in pictures which refer to the video parameter set.

Figure 11:
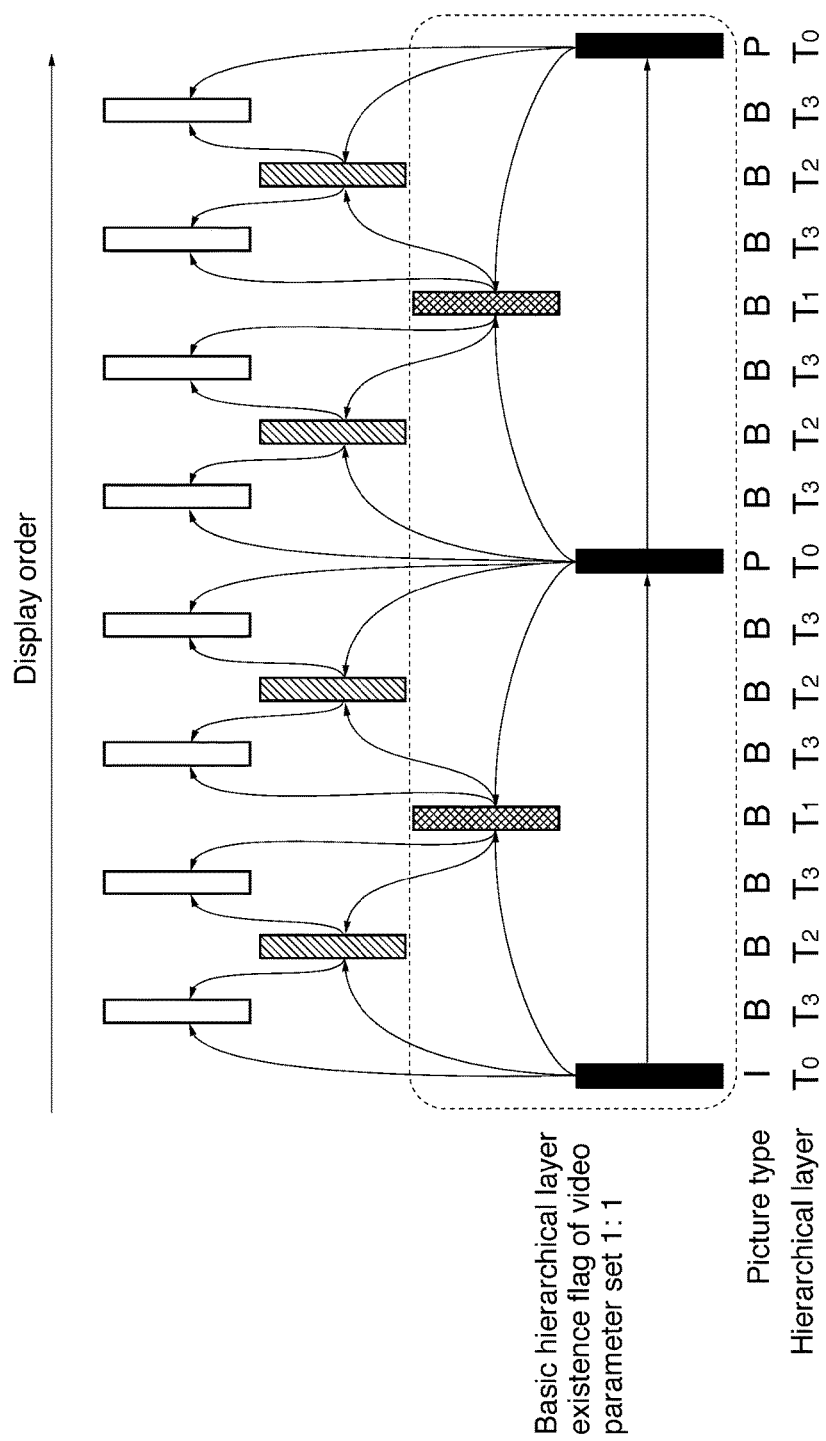
FIG. 11 is an explanatory drawing showing an example of time hierarchically encoded video data in Embodiment 1 of the present invention.

In the example shown in FIGS. 3 and 11, the video parameter set is encoded only at the head of the sequence, the sequence shown in FIGS. 3 and 11 is configured with pictures in the basic hierarchical layer and the first hierarchical layer, and the pictures in the basic hierarchical layer and the first hierarchical layer are encoded by referring to the video parameter set 1. In this case, since the pictures which refer to the video parameter set include the basic hierarchical layer, a basic hierarchical layer existence flag showing whether or not the basic hierarchical layer is included in the pictures which refer to the video parameter set, is set to a value (e.g. 1) for showing that the basic hierarchical layer is included.

Figure 12:
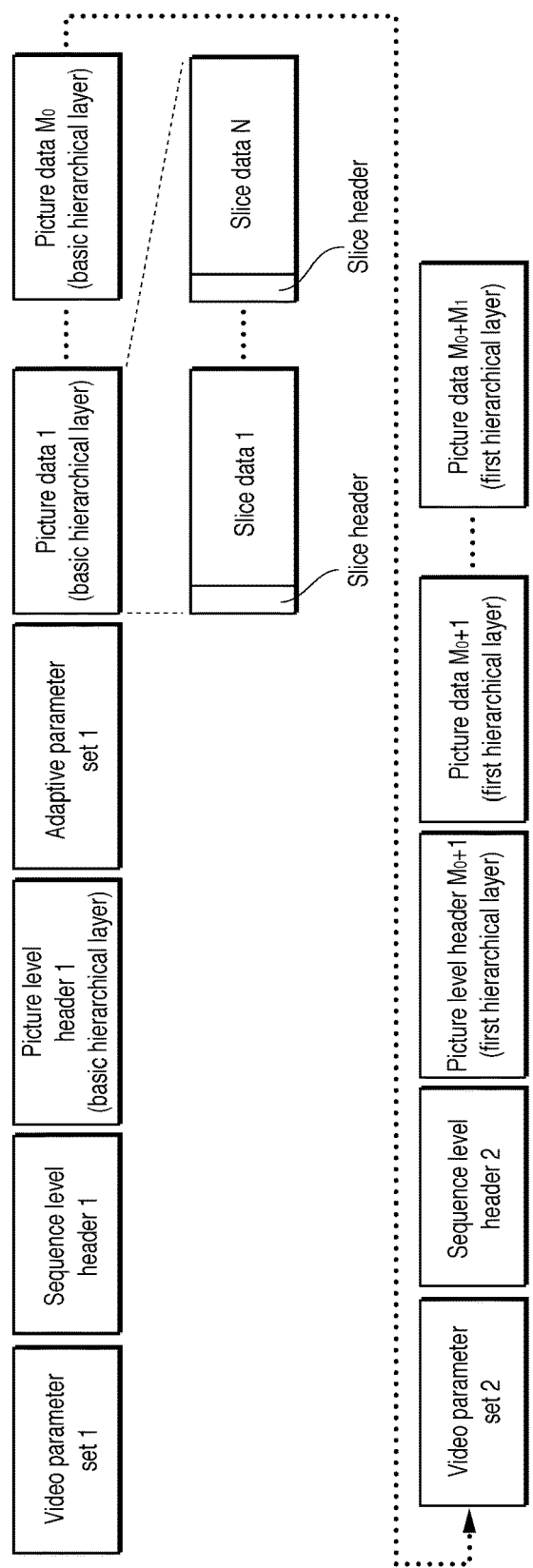
FIG. 12 is an explanatory drawing showing an example of another encoded bitstream in Embodiment 1 of the present invention.
Figure 13:
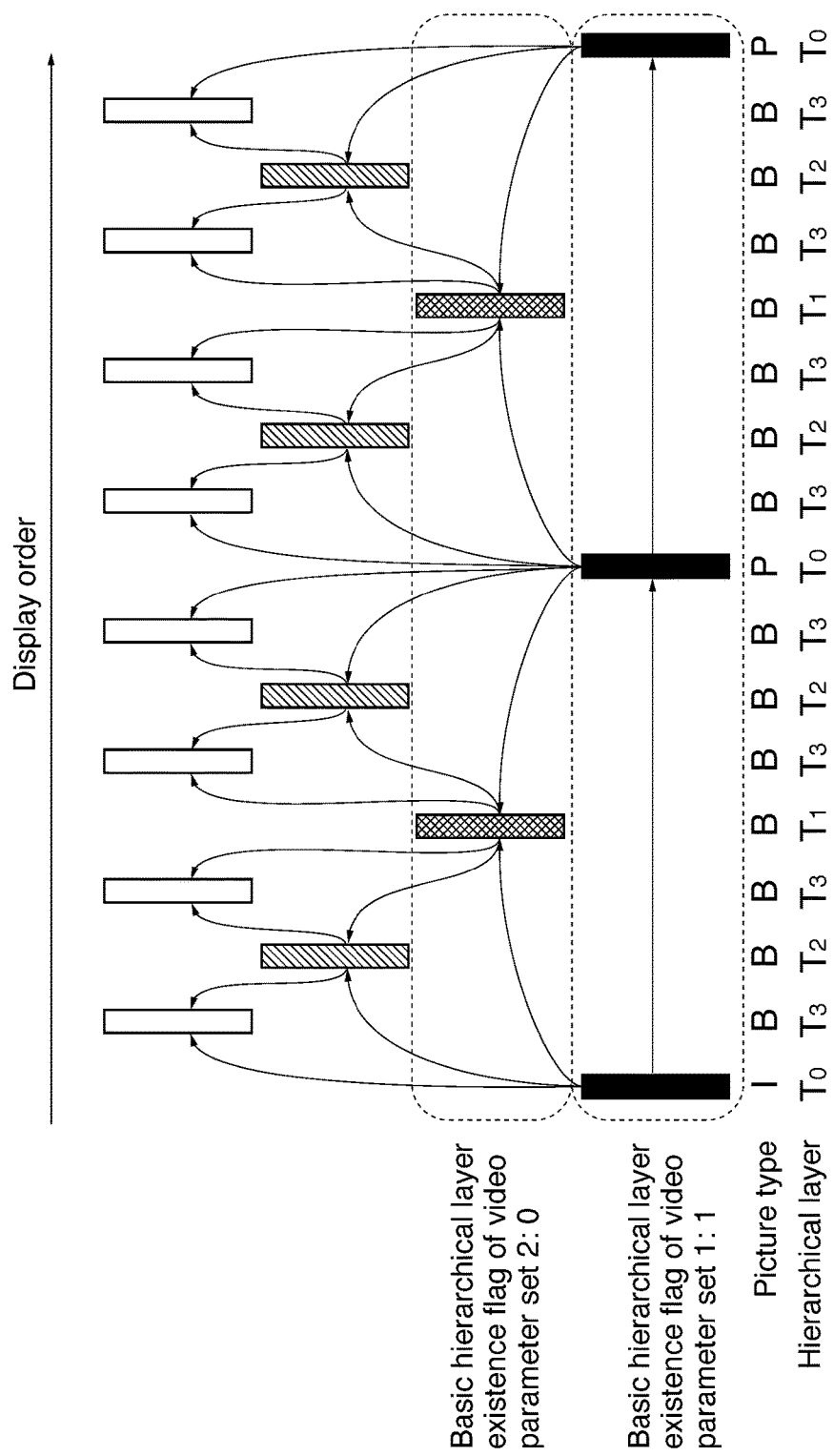
FIG. 13 is an explanatory drawing showing another example of time hierarchically encoded video data in Embodiment 1 of the present invention.

In the example shown in FIGS. 12 and 13, the sequence is configured for each of the hierarchical layers, the video parameter set which is encoded only at the head of the sequence is encoded for each of the hierarchical layers, and the pictures in the basic hierarchical layer are encoded by referring to the video parameter set 1. In this case, since the pictures which refer to the video parameter set 1 include the basic hierarchical layer, a basic hierarchical layer existence flag showing whether or not the basic hierarchical layer is included in the pictures which refer to the video parameter set 1, is set to a value (e.g. 1) for showing that the basic hierarchical layer is included. On the other hand, since the pictures which refer to the video parameter set 2 do not include the basic hierarchical layer, a basic hierarchical layer existence flag showing whether or not the basic hierarchical layer is included in the pictures which refer to the video parameter set 2, is set to a value (e.g. 0) for showing that the basic hierarchical layer is not included.

When the basic hierarchical layer existence flag shows that the basic hierarchical layer is not included, the maximum number of hierarchical layers may be restricted so as to have a value of more than one, because the sequence needs to be configured with pictures of the basic hierarchical layer and one or more hierarchical layers.

As another example, when the maximum number of hierarchical layers is more than one, the basic hierarchical layer existence flag may be encoded in the video parameter set.

In the video parameter set, an index (video_parameteter_set_id) for identifying a plurality of video parameter sets which are multiplexed into the encoded bitstream is also encoded.

In the example shown in FIG. 12, encoding may be carried out so that the identification index (video_parameteter_set_id) for the video parameter set 1 has a value same as that for the video parameter set 2. That is, encoding is carried out so that the identification index for the video parameter set referred to by the pictures which are time hierarchically encoded in the same sequence has the same value.

As to values of parameters (maximum number of hierarchical layers, picture buffer size of each hierarchical layer, and identification index) for the video parameter set referred to by the pictures which are time hierarchically encoded in the same sequence, other than the basic hierarchical layer existence flag showing whether or not the basic hierarchical layer is included, encoding may be carried out so that the parameters have the same value, or may be carried out so that each of the parameters has a different value.

Next, an example will be explained in which the encoded bitstream shown in FIGS. 12 and 13 is transmitted by using a different line for each of the hierarchical layers. The encoded data about the pictures of the basic hierarchical layer which refer to the video parameter set 1 is transmitted, for example, using the radio wave, and the encoded data about the pictures of the first hierarchical layer and so on which refer to the video parameter set 2 is transmitted, for example, using the IP network.

In a decoding device which receives only the radio wave and carries out decoding, only the pictures in the basic hierarchical layer can be normally decoded.

In a decoding device which receives data via both the radio wave and the IP network and carries out decoding, when receiving, via the radio wave, the encoded data about the pictures which refer to the video parameter set 1, the basic hierarchical layer existence flag indicates that the basic hierarchical layer is included, and thus the pictures in the basic hierarchical layer can be normally decoded. After that, when receiving, via the IP network, the encoded data about the picture which refers to the video parameter set 2, the basic hierarchical layer existence flag indicates that the basic hierarchical layer is not included. However, since the pictures in the basic hierarchical layer have been already decoded, pictures in the first hierarchical layer and so on can be normally decoded. When receiving, via the IP network, the encoded data about the picture which refers to the video parameter set 2, before receiving, via the radio wave, the encoded data about the pictures which refer to the video parameter set 1, it is determined, on the basis of the basic hierarchical layer existence flag value decoded from the video set parameter 2, that the pictures in the basic hierarchical layer are not included in the encoded data, received via the IP network, about the pictures which refer to the video parameter set 2, and, because decoding of the encoded data, received via the radio wave, about the pictures which refer to the video parameter set 1 have not been completed, it is also determined that decoding needs to be started after the completion of the above-mentioned decoding. While a case is explained in the example shown in FIG. 13 in which the basic hierarchical layer existence flag is set in the video parameter sets about the basic hierarchical layer and the first hierarchical layer, when the basic hierarchical layer existence flag same as that in the first hierarchical layer is set, for example, in the video parameter set 3 about the second hierarchical layer and the encoded data about the picture which refers to the video parameter set 3 is received first, it is determined that decoding needs to be started after the completion of the decoding of the encoded data about the pictures which refer to the video parameter set 1 and of the encoded data about the pictures which refer to the video parameter set 2.

The video parameter set is encoded ahead of the sequence level header, and an identification index (video_parameteter_set_id) of a video parameter to be referred to is encoded in the sequence level header.

In a conventional encoding/decoding device which has no basic hierarchical layer existence flag, a case is not envisaged in which, for example, the video parameter set 2 is received via the IP network before receiving the video parameter set 1 via the radio wave. Therefore, since decoding starts on receiving a sequence, a situation in which the video data of the basic hierarchical layer frame is included is indispensable for carrying out the decoding. On the other hand, in the encoding/decoding device in the present invention, even in a case in which the decoding device does not always receive the encoded bitstream in the order of hierarchical layers, e.g. the encoded bitstream is transmitted by using a different line for each of the hierarchical layers, the basic hierarchical layer existence flag is encoded as a video parameter set, the flag showing whether or not the basic hierarchical layer is included in the pictures which refer to the video parameter set, and thus the decoding device can determine whether or not the pictures in the basic hierarchical layer are included. Therefore, since a process can be carried out in which, when the pictures in the basic hierarchical layer are included, the pictures in the basic hierarchical layer are immediately decoded, and in which, when the pictures in the basic hierarchical layer are not included, decoding is performed after the pictures in the basic hierarchical layer are decoded, a process of scalable encoding and decoding can be carried out in such a way that the video data in which only the frame belonging to the upper hierarchical layer is encoded can be separately processed.

Not only in the temporal scalability, but also in other scalable coding methods and a multi-view coding method, the basic hierarchical layer existence flag may be a flag showing whether or not pictures in a basic hierarchical layer or a base view are included in pictures to be referred to.

Figure 14:
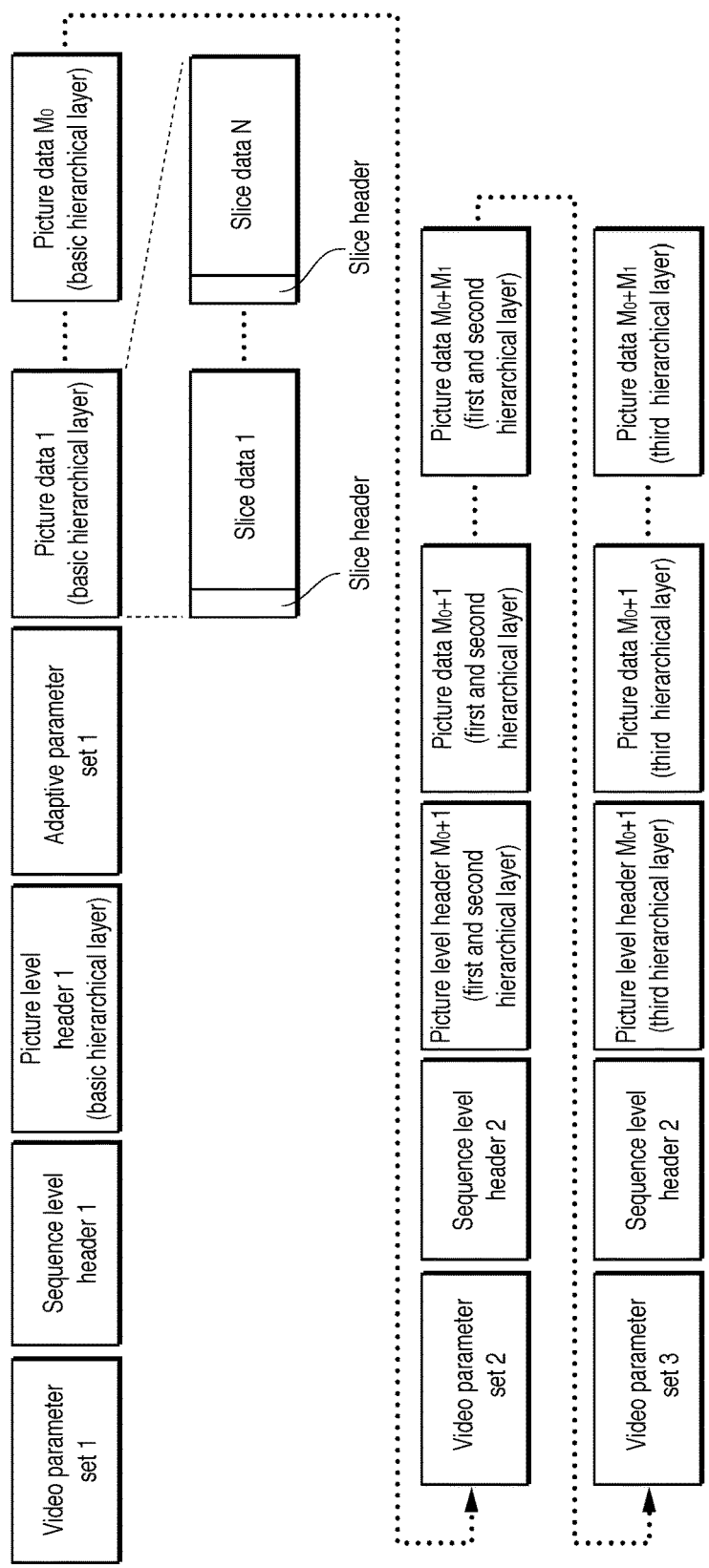
FIG. 14 is an explanatory drawing showing an example of another encoded bitstream in Embodiment 1 of the present invention.
Figure 15:
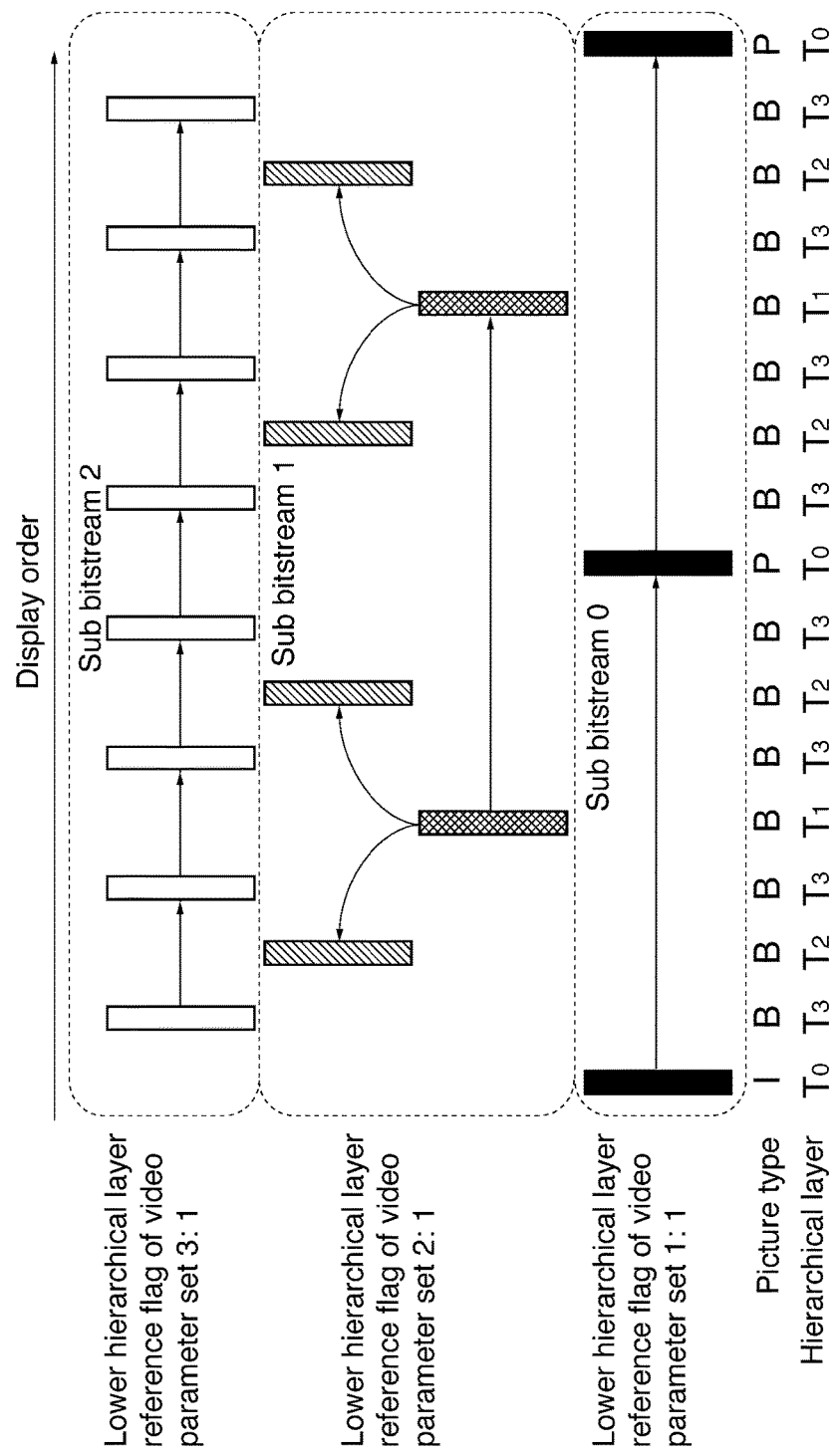
FIG. 15 is an explanatory drawing showing another example of time hierarchically encoded video data in Embodiment 1 of the present invention.

As another example of a video parameter set, there may be encoded a lower hierarchical layer reference flag showing that a picture (picture concerned) of a hierarchical layer which refers to the video parameter set does not refer, in a prediction, to pictures of a hierarchical layer lower than that of its own (picture concerned). As shown in FIGS. 14 and 15, when the temporal scalability is employed and when the lower hierarchical layer reference flag is set to a value (e.g. 1) showing that pictures of a hierarchical layer lower than that of the picture concerned are not referred to in a prediction, reference pictures which can be used in the prediction are limited to pictures belonging to a hierarchical layer same as that of the picture concerned, and thus a picture unit (sub bitstream) which refers to the video parameter set can be set regardless of whether or not there exists a hierarchical layer lower than that of the picture concerned. Meanwhile, when it is not shown that pictures of a hierarchical layer lower than that of the picture concerned are not referred to in a prediction, the lower hierarchical layer reference flag is set to 0, for example.

For example, when the encoded data about pictures of the basic hierarchical layer which refer to the video parameter set 1 is transmitted by using, for example, the radio wave, and when the encoded data about pictures of the first and second hierarchical layers which refer to the video parameter set 2 and the encoded data about pictures of the third hierarchical layer which refer to the video parameter set 3 are transmitted by using, for example, the IP network, if the lower hierarchical layer reference flag of any of the video parameter sets is set to a value showing that pictures of a hierarchical layer lower than that of the picture concerned are not referred to in the prediction, as shown in FIG. 15, the decoding device which receives the data (sub bitstreams 1 and 2) transmitted by using the IP network can immediately decode the received data, regardless of whether or not the pictures of the hierarchical layer lower than that of the picture concerned are already received.

In the conventional encoding/decoding device which has no lower hierarchical layer reference flag, since pictures of a hierarchical layer lower than that of the picture concerned are always referred to in a prediction, only a sub bitstream having the basic hierarchical layer can be defined. On the other hand, in the encoding/decoding device in the present invention, the lower hierarchical layer reference flag is encoded as a video parameter set, the flag showing that a picture of a hierarchical layer which refers to the video parameter set does not refer, in a prediction, to pictures of a hierarchical layer lower than that of the picture concerned. Thus, a picture unit (sub bitstream) which refers to the video parameter set can be set regardless of whether or not there exists a hierarchical layer lower than that of the picture concerned, and, when receiving such a sub bitstream, the decoding device can immediately decode the received data, regardless of whether or not the pictures of the hierarchical layer lower than that of the picture concerned are already received. Therefore, a device can be obtained in which a process of scalable encoding and decoding can be carried out in such a way that the video data in which only the frame belonging to the upper hierarchical layer is encoded can be separately processed.

Not only in the temporal scalability, but also in other scalable coding methods and a multi-view coding method, the lower hierarchical layer reference flag may be a flag showing that pictures which can be used in the prediction are limited to pictures belonging to a hierarchical layer or a view same as that of the picture concerned.

Figure 16:
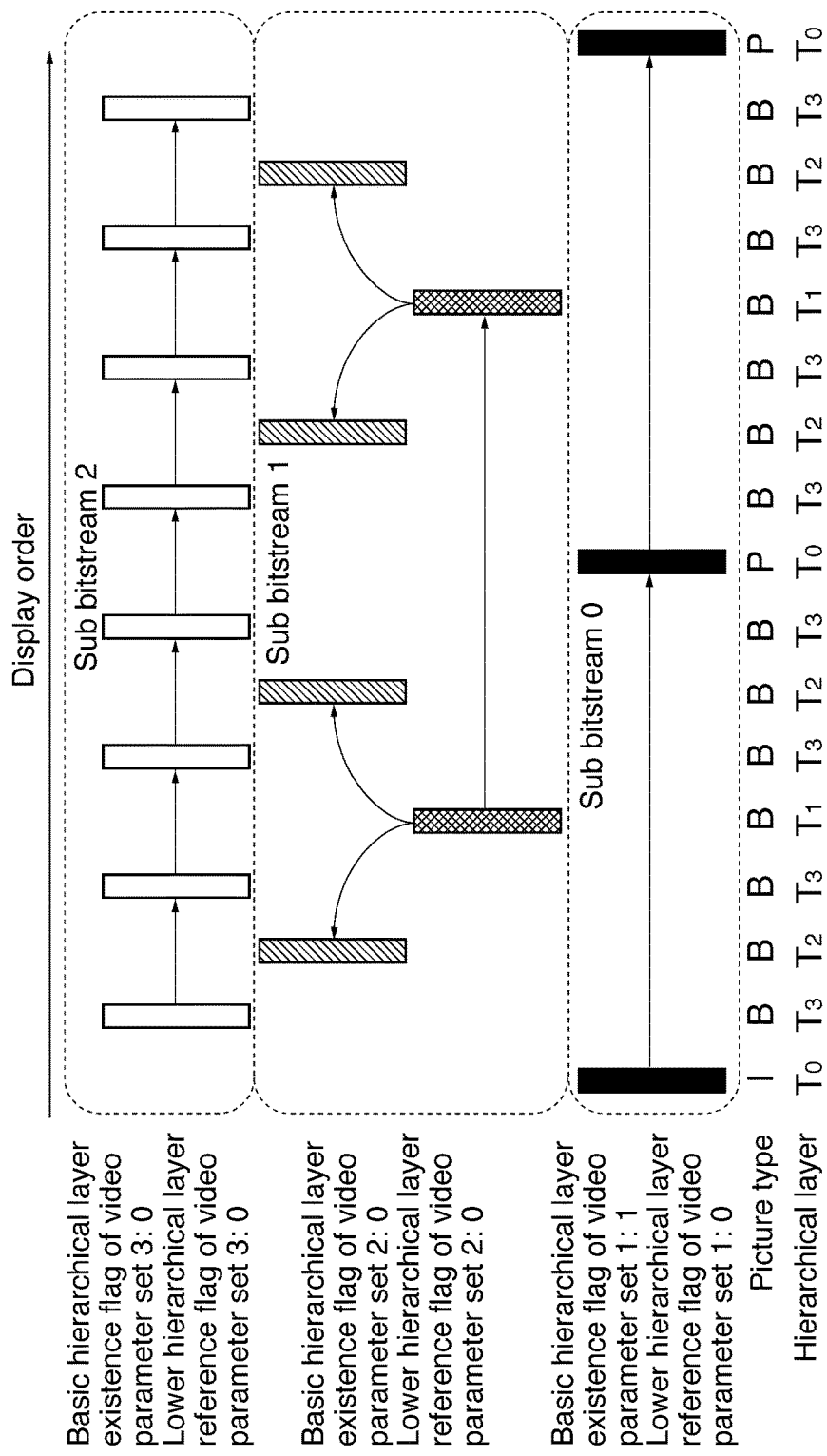
FIG. 16 is an explanatory drawing showing another example of time hierarchically encoded video data in Embodiment 1 of the present invention.
Figure 17:
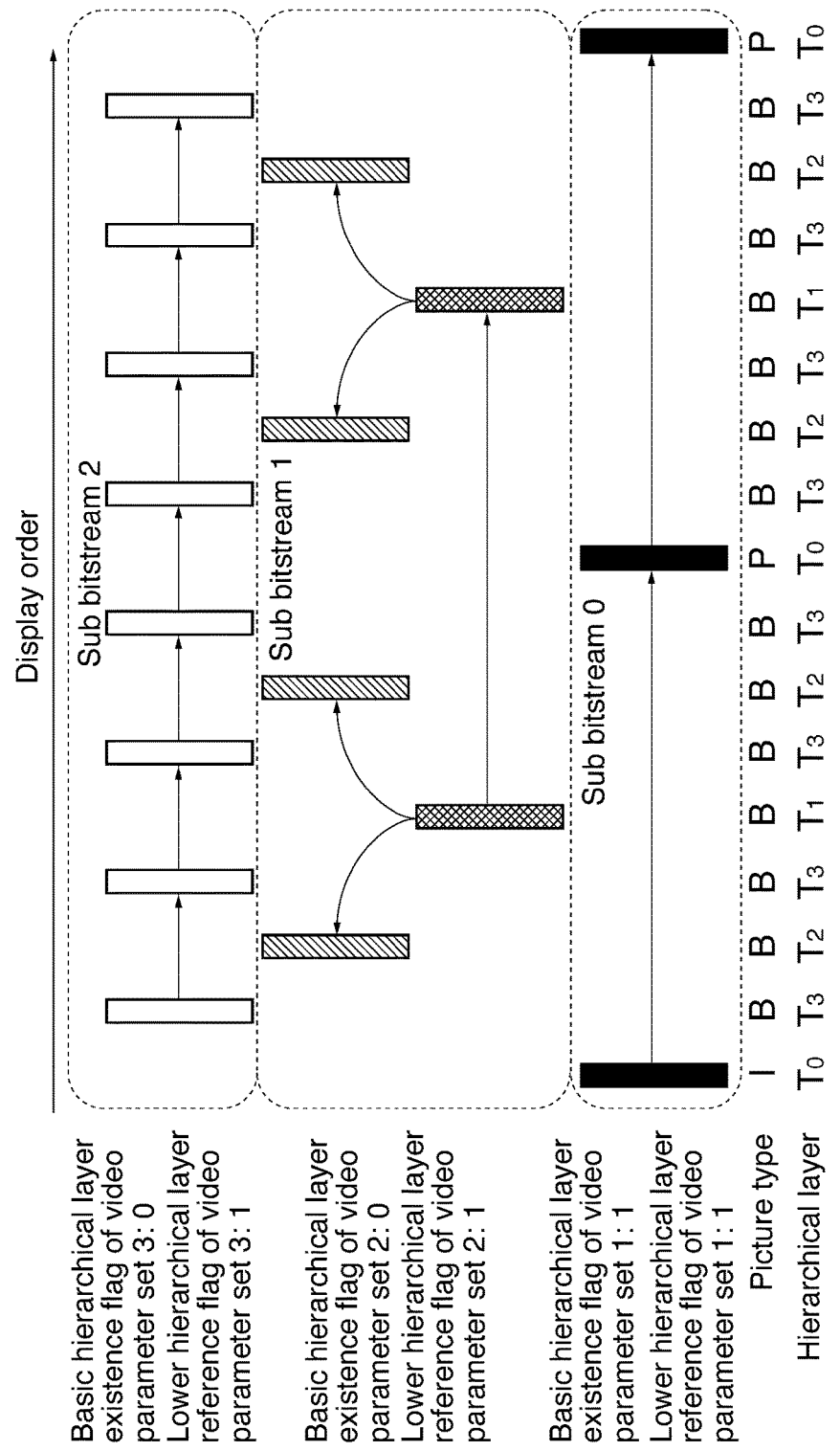
FIG. 17 is an explanatory drawing showing another example of time hierarchically encoded video data in Embodiment 1 of the present invention.

While a case is explained in which the above-described basic hierarchical layer existence flag and lower hierarchical layer reference flag are separately encoded as a video parameter set, the basic hierarchical layer existence flag and lower hierarchical layer reference flag may be encoded in a combined manner. For example, when video data in which only frames belonging to upper hierarchical layers are encoded is requested to be separately processed while the video data is data to be decoded without decreasing coding efficiency, as shown in FIGS. 14 and 16, the basic hierarchical layer existence flag of each of frames (sub bitstreams 1 and 2) belonging to the upper hierarchical layers is set to 0 and the lower hierarchical layer reference flag of each of the frames is set to 1, and thus, when receiving the sub bitstreams 1 and 2, the decoding device decodes the sub bitstreams 1 and 2 after the completion of receiving the sub bitstream 1. When video data in which only frames belonging to upper hierarchical layers are encoded is requested to be separately processed while the video data in which only the frames belonging to upper hierarchical layers are encoded is data to be processed alone, as shown in FIGS. 14 and 17, the basic hierarchical layer existence flag of each of frames (sub bitstreams 1 and 2) belonging to the upper hierarchical layers is set to 0 and the lower hierarchical layer reference flag of each of the frames is set to 0, and thus, on receiving the sub bitstreams 1 and 2, the decoding device decodes the sub bitstreams 1 and 2 regardless of whether or not there exists a hierarchical layer lower than that of the picture concerned. In this way, by using the basic hierarchical layer existence flag and the lower hierarchical layer reference flag in a combined manner, it becomes possible to change processing for each application data having different request.

While a case is explained in Embodiment 1 in which the above-described basic hierarchical layer existence flag and lower hierarchical layer reference flag are set in a video parameter set, the flags may be set in a sequence level header.

While a case is explained in Embodiment 1 in which the basic hierarchical layer existence flag has a set of modes, i.e. showing that the basic hierarchical layer is included (e.g. 1) and showing that the basic hierarchical layer is not included (e.g. 0), the flag may have another set of modes, i.e. showing that the basic hierarchical layer is not included (e.g. 1) and not showing that the basic hierarchical layer is not included (e.g. 0).

While a case is explained in Embodiment 1 in which the lower hierarchical layer reference flag has a set of modes, i.e. showing that a picture of a hierarchical layer which refers to the video parameter set does not refer, in a prediction, to pictures of a hierarchical layer lower than that of the picture concerned (e.g. 1) and not showing that a picture does not refer to (e.g. 0), the flag may have another set of modes, i.e. showing that a picture of a hierarchical layer which refers to the video parameter set does not refer, in a prediction, to pictures of a hierarchical layer lower than that of the picture concerned (e.g. 1) and showing that a picture refers to (e.g. 0).

Values 0 and 1 in both flags may be set reversely.

Next, encoding of a NAL unit which includes a video parameter set as encoded data will be explained. As described above, the NAL unit is configured with the header section and the payload data section, and the type information and the hierarchical layer identification number, etc. are included in the header section. An encoded value of the hierarchical layer identification number when the type information indicates a video parameter set will be explained. As described above, the hierarchical layer identification number is a number for showing, when video data is time hierarchically encoded, which hierarchical layer the encoded data relates to. When encoded data relates to a plurality of hierarchical layers, such as a video parameter set, a number showing a relationship with the lowest hierarchical layer is encoded. In the example shown in FIGS. 3 and 11, since the video parameter set is referred to by the basic hierarchical layer and first hierarchical layer, the encoded data relates to the basic hierarchical layer and first hierarchical layer. In this case, as the hierarchical layer identification number of the NAL unit which includes the video parameter set, "0" which shows the lowest hierarchical layer, i.e. the basic hierarchical layer, is encoded. In the example shown in FIGS. 12 and 13, since pictures in the basic hierarchical layer are encoded by referring to the video parameter set 1 and pictures in the first hierarchical layer are encoded by referring to the video parameter set 2, "0" is encoded as the hierarchical layer identification number of the NAL unit which includes the video parameter set 1, and "1" is encoded as the hierarchical layer identification number of the NAL unit which includes the video parameter set 2.

Next, the process carried out by the intra prediction unit 4 will be explained in detail.

Figure 18:
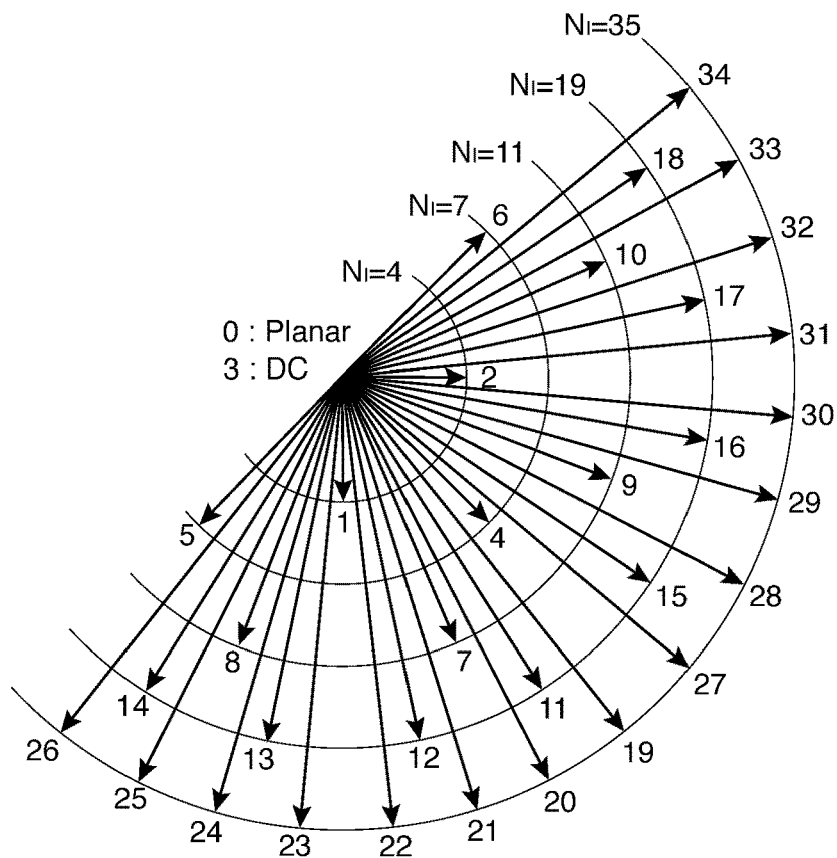
FIG. 18 is an explanatory drawing showing an example of intra prediction parameters (intra prediction modes) which can be selected for each prediction block $P_i^n$ in a coding block $B^n$.

FIG. 18 is an explanatory drawing showing an example of intra prediction modes each of which is an intra prediction parameter which can be selected for each prediction block $P_i^n$ in the coding block $B''$. Here, $N_I$ shows the number of intra prediction modes.

In FIG. 18, the index values of the intra prediction modes and prediction direction vectors represented by each of the intra prediction modes are shown. In the example shown in FIG. 18, it is designed that a relative angle between prediction direction vectors decreases as the number of selectable intra prediction modes increases.

The intra prediction unit 4 carries out, as mentioned above, the intra prediction process on each prediction block $P_i^n$ by referring to the intra prediction parameter of the prediction block $P_i^n$, to generate an intra prediction image $P_{INTRAi}^n$. Here, an intra process of generating an intra prediction signal of a prediction block $P_i^n$ in a luminance signal will be explained.

It is assumed that the size of the prediction block $P_i^n$ is $l_i^n \times m_i^n$ pixels.

Figure 19:
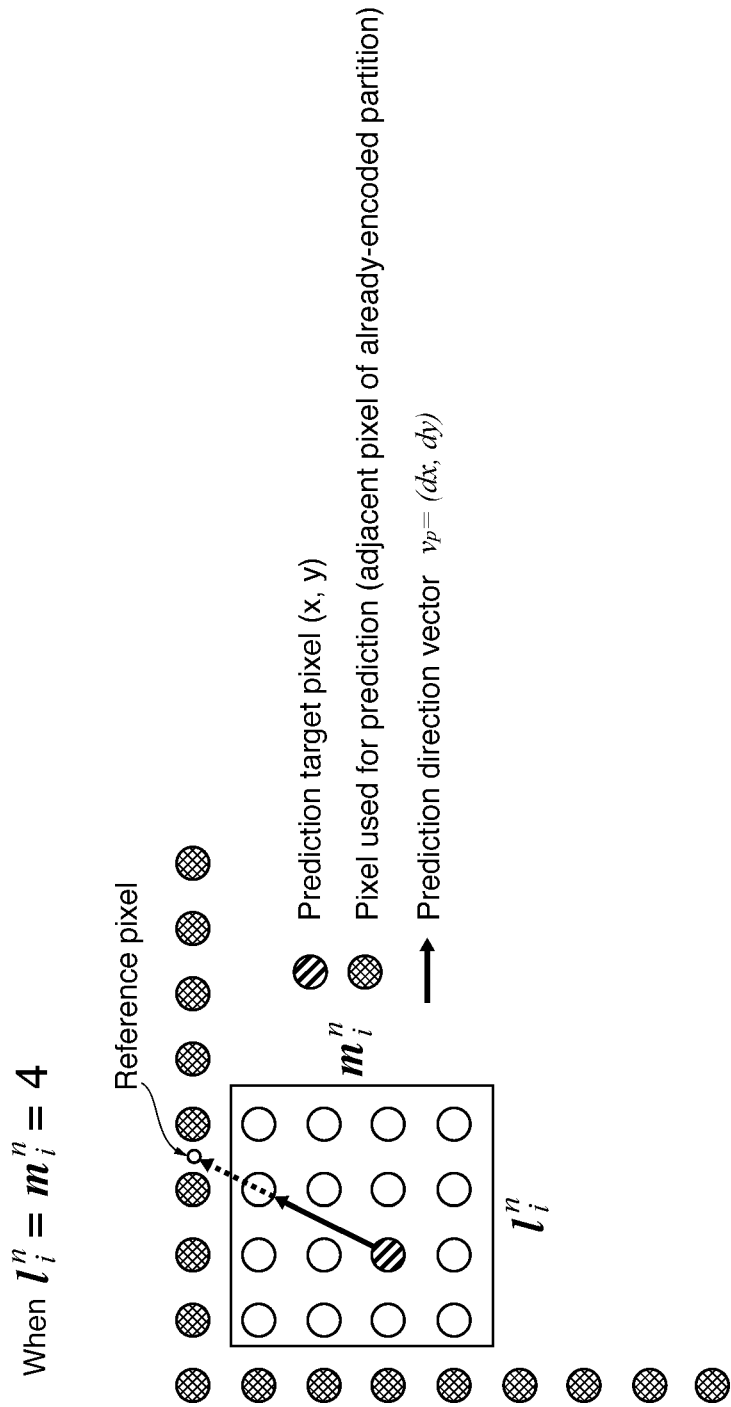
FIG. 19 is an explanatory drawing showing an example of pixels which are used when generating a predicted value of each pixel in a prediction block $P_i^n$ in a case of $l_i^n = m_i^n = 4$.

FIG. 19 is an explanatory drawing showing an example of pixels which are used when generating a predicted value of each pixel in the prediction block $P_i^n$ in a case of $l_i^n = m_i^n = 4$.

Although $(2 \times l_i^n + 1)$ already-encoded pixels located above the prediction block $P_i^n$ and $(2 \times m_i^n)$ already-encoded pixels located to the left thereof are set as the pixels used for prediction in FIG. 19, a larger or smaller number of pixels than the pixels shown in FIG. 19 may be used for the prediction.

Further, although one row or one column of pixels adjacent to the prediction block $P_i^n$ are used for prediction in FIG. 19, two or more rows or columns of pixels may be alternatively used for the prediction.

When the index value of the intra prediction mode for the prediction block $P_i^n$ is 0 (planar prediction), already-encoded pixels adjacent to the top of the prediction block $P_i^n$ and already-encoded pixels adjacent to the left of the prediction block $P_i^n$ are used to generate a prediction image in which a value interpolated according to the distance between these pixels and the target pixel to be predicted in the prediction block $P_i^n$ is employed as a predicted value.

Further, when the index value of the intra prediction mode for the prediction block $P_i^n$ is 2 (average value (DC) prediction), a prediction image is generated in which each average value of the already-encoded pixels adjacent to the top of the prediction block $P_i^n$ and the already-encoded pixels adjacent to the left of the prediction block $P_i^n$ is employed as a predicted value of each pixel in the prediction block $P_i^n$.

When the index value of the intra prediction mode is other than 0 (planar prediction) and 2 (average value prediction), a predicted value of each pixel in the prediction block $P_i^n$ is generated on the basis of a prediction direction vector $v_p = (dx, dy)$ shown by the index value.

As shown in FIG. 19, when the relative coordinates in the prediction block $P_i^n$ are expressed as (x, y) with the pixel at the upper left corner of the prediction block $P_i^n$ being defined as the point of origin, each reference pixel which is used for the prediction is located at a point of intersection of L shown below and an adjacent pixel;

$$L = \begin{pmatrix} x \\ y \end{pmatrix} + k v_P \quad (1)$$

where k is a negative scalar value.

When a reference pixel is at an integer pixel position, the value of the corresponding integer pixel is determined as a predicted value of the target pixel to be predicted, whereas when a reference pixel is not at an integer pixel position, the value of an interpolation pixel generated from the integer pixels which are adjacent to the reference pixel is determined as a predicted value.

In the example shown in FIG. 19, because a reference pixel is not located at an integer pixel position, the predicted value is interpolated from the values of two pixels adjacent to the reference pixel. Not only the adjacent two pixels but also two or more adjacent pixels may be used in generating an interpolation pixel and the value of this interpolation pixel may be employed as a predicted value.

The increase in the number of pixels used for the interpolation process provides an advantage of improving the accuracy in computation of an interpolation pixel. On the other hand, because it also increases the degree of complexity in computations required for the interpolation process, it is preferable to generate an interpolation pixel from a larger number of pixels when the video encoding device requires high encoding quality even if the arithmetic load is large.

Through the process described above, prediction pixels for all the pixels of the luminance signal in the prediction block $P_i^n$ are generated, and an intra prediction image $P_{INTRAi}^n$ is outputted.

The intra prediction parameter (intra prediction mode) used for generating the intra prediction image $P_{INTRAi}^n$ is outputted to the variable length encoding unit 13, to be multiplexed into the bitstream.

Similar to a smoothing process carried out on a reference image at an intra prediction on an 8×8-pixel block under the MPEG-4 AVC/H.264 coding method explained previously, even if a configuration is employed in the intra prediction unit 4 in which an already-encoded pixel, adjacent to the prediction block $P_i^n$, on which a smoothing process is carried out is provided as a reference pixel when generating an intermediate prediction image of the prediction block $P_i^n$, the filtering process, which is the same as the above-mentioned example, can be carried out on the intermediate prediction image.

An intra prediction process based on the intra prediction parameter (intra prediction mode) on each of the color difference signals of the prediction block $P_i^n$ is also carried out according to the procedure same as that for the luminance signal, and the intra prediction parameter used for generating the intra prediction image is outputted to the variable length encoding unit 13.

However, selectable intra prediction parameters (intra prediction modes) for each of the color difference signals may differ from those for the luminance signal. For example, in a case of a YUV signal having a 4:2:0 format, each of the color difference signals (U and V signals) is a signal whose resolution is reduced to one-half that of the luminance signal (Y signal) both in a horizontal direction and a vertical direction and image signal complexity thereof is lower than that of the luminance signal, and hence a prediction can be carried out easily. Therefore, by reducing the number of selectable intra prediction parameters compared to that for the luminance signal, the code amount required to encode the intra prediction parameter and the computation amount for the prediction process may be reduced.

Next, the processing carried out by the video decoding device shown in FIG. 6 will be explained concretely.

When receiving the encoded bitstream generated by the video encoding device shown in FIG. 1, the variable length decoding unit 31 carries out a variable length decoding process on the bitstream (step ST21 in FIG. 8) to decode the following: header information (sequence level header) for each sequence configured with pictures of one or more frames, including frame size information and information such as a flag showing whether or not the pictures in the sequence encoded as the video parameter set are time hierarchically encoded, the maximum number of hierarchical layers, the picture buffer size needed for each hierarchical layer, and the basic hierarchical layer existence flag showing whether or not the basic hierarchical layer is included in the pictures which refer to the video parameter set, etc.; header information (picture level header) for each picture; and the filter parameter and the quantization matrix parameter, to be used in the loop filter unit 38, encoded as the adaptive parameter set.

When the lower hierarchical layer reference flag is encoded as the video parameter set in the encoding device, the flag showing whether or not a picture of a hierarchical layer which refers to the video parameter set refers, in a prediction, to pictures of a hierarchical layer lower than that of the picture concerned, the flag is decoded.

When the maximum number of hierarchical layers is more than one and when the basic hierarchical layer existence flag is encoded in the video parameter set, the basic hierarchical layer existence flag is to be decoded only when the maximum number of hierarchical layers is more than one.

Operations and effects when the basic hierarchical layer existence flag and the lower hierarchical layer reference flag are decoded are already described.

The variable length decoding unit 31 also determines the largest coding block size and the upper limit on the number of hierarchical layers partitioned which are determined by the encoding controlling unit 2 of the video encoding device shown in FIG. 1, according to the procedure same as that in the video encoding device (step ST22).

For example, when the largest coding block size and the upper limit on the number of hierarchical layers partitioned are determined according to the resolution of the video signal, the largest coding block size is determined on the basis of the decoded frame size information, according to the procedure same as that in the video encoding device.

When the largest coding block size and the upper limit on the number of hierarchical layers partitioned are multiplexed into the sequence level header or the like by the video encoding device, the values decoded from the header are used.

Hereinafter, in the video decoding device, the above-mentioned largest coding block size is referred to as a largest decoding block size, and the largest coding block is referred to as a largest decoding block.

The variable length decoding unit 31 decodes the partitioning state of a largest decoding block shown in FIG. 10, for each determined largest decoding block. Decoding blocks (blocks corresponding to "coding blocks" in video encoding device shown in FIG. 1) are hierarchically specified on the basis of the decoded partitioning state (step ST23).

The variable length decoding unit 31 then decodes the coding mode assigned to each decoding block. Each decoding block is further partitioned into one or more prediction blocks each serving as a unit for prediction process, on the basis of the information included in the coding mode which is decoded, and the prediction parameter assigned to each prediction block is decoded (step ST24).

More specifically, when the coding mode assigned to a decoding block is the intra coding mode, the variable length decoding unit 31 decodes the intra prediction parameter for each of the one or more prediction blocks which are included in the decoding block and each serving as a unit for the prediction process.

In contrast, when the coding mode assigned to a decoding block is the inter coding mode, the variable length decoding unit decodes the inter prediction parameter and the motion vector for each of the one or more prediction blocks which are included in the decoding block and each serving as a unit for the prediction process (step ST24).

The variable length decoding unit 31 also decodes the compressed data (transformed and quantized transform coefficients) for each orthogonal transformation block on the basis of the orthogonal transformation block partitioning information included in the prediction difference coding parameters (step ST24).

When the coding mode m(B″) variable-length-decoded by the variable length decoding unit 31 is an intra coding mode (when m(B″)∈INTRA), the select switch 33 outputs the intra prediction parameter for each prediction block, which is variable-length-decoded by the variable length decoding unit 31, to the intra prediction unit 34.

In contrast, when the coding mode m(B″) variable-length-decoded by the variable length decoding unit 31 is the inter coding mode (when m(B″)∈INTER), the select switch outputs the inter prediction parameter and the motion vector for each prediction block, which are variable-length-decoded by the variable length decoding unit 31, to the motion compensation unit 35.

When the coding mode m(B″) variable-length-decoded by the variable length decoding unit 31 is the intra coding mode (m(B″)∈INTRA) (step ST25), the intra prediction unit 34 receives the intra prediction parameter for each prediction block outputted from the select switch 33, and carries out an intra prediction process, using the above-mentioned intra prediction parameter and according to the procedure same as that in the intra prediction unit 4 shown in FIG. 1, on each prediction block $P_i^n$ in the decoding block B″ while referring to the decoded image stored in the memory 37 for intra prediction, to generate an intra prediction image $P_{INTRAi}^n$ (step ST26).

When the coding mode m(B″) variable-length-decoded by the variable length decoding unit 31 is the inter coding mode (m(B″)∈INTER) (step ST25), the motion compensation unit 35 receives the motion vector and the inter prediction parameter for each prediction block which are outputted from the select switch 33, and carries out an inter prediction process, using the motion vector and the inter prediction parameter, on each prediction block $P_i^n$ in the decoding block B″ while referring to the decoded image stored in the motion-compensated prediction frame memory 39 and on which the filtering process is carried out, to generate an inter prediction image $P_{INTERi}^n$ (step ST27).

When receiving the compressed data and the prediction difference coding parameters from the variable length decoding unit 31, the inverse quantization/inverse transformation unit 32 inverse-quantizes the compressed data for each orthogonal transformation block by referring to the quantization parameter and the orthogonal transformation block partitioning information which are included in the prediction difference coding parameters, according to the procedure same as that in the inverse quantization/inverse transformation unit 8 shown in FIG. 1.

At that time, the header information variable-length-decoded by the variable length decoding unit 31 is referred to, and, when the header information shows that the inverse quantization process using the quantization matrix is carried out in the slice, the inverse quantization process is carried out by using the quantization matrix.

At that time, by referring to the header information variable-length-decoded by the variable length decoding unit 31, the quantization matrix used for each color signal and coding mode (intra coding or inter coding) on each orthogonal transformation size is specified.

Concretely, a quantization matrix of the adaptive parameter set which is specified by a slice level header and which is referred to by the slice, is set as the quantization matrix to be used in the slice.

The inverse quantization/inverse transformation unit 32 also carries out an inverse orthogonal transformation process on the transform coefficients, for each orthogonal transformation block, which are the compressed data inverse-quantized, to calculate a decoding prediction difference signal which is the same as the local decoding prediction difference signal outputted from the inverse quantization/inverse transformation unit 8 shown in FIG. 1 (step ST28).

The adding unit 36 adds the decoding prediction difference signal calculated by the inverse quantization/inverse transformation unit 32 and either one of the intra prediction image $P_{INTRAi}^n$ generated by the intra prediction unit 34 or the inter prediction image $P_{INTERi}^n$ generated by the motion compensation unit 35, to calculate a decoded image and outputs the decoded image to the loop filter unit 38, and also stores the decoded image in the memory 37 for intra prediction (step ST29).

This decoded image is a decoded image signal to be used in subsequent intra prediction processes.

When completing the processes of steps ST23 through ST29 on all the decoding blocks B″ (step ST30), the loop filter unit 38 carries out a predetermined filtering process on the decoded image outputted from the adding unit 36, and stores the decoded image filtering-processed thereby in the motion-compensated prediction frame memory 39 (step ST31).

Concretely, the loop filter unit carries out a filtering (deblocking filtering) process of reducing distortion occurring at a boundary between orthogonal transformation blocks and at a boundary between prediction blocks, a process (pixel adaptive offset process) of adaptively adding an offset to each pixel, an adaptive filtering process of adaptively switching among linear filters, such as Wiener filters, and performing the filtering process, and so on.

The loop filter unit 38 determines, by referring to the header information variable-length-decoded by the variable length decoding unit 31, whether or not to perform each of the above-mentioned deblocking filtering process, pixel adaptive offset process, and adaptive filtering process on the slice.

At that time, when two or more filtering processes are carried out, if the loop filter unit 11 in the video encoding device has the configuration shown in FIG. 2, the loop filter unit 38 has the configuration shown in FIG. 7.

In the deblocking filtering process, an adaptive parameter set which is referred to by the slice is referred to, and, when there exists information indicating that various parameters to be used for selecting the intensity of the filter applied to a block boundary are changed from the initial values, a deblocking filtering process is performed on the basis of the information of changing. If there exists no information of changing, the process is performed according to a predetermined method.

In the pixel adaptive offset process, an adaptive parameter set which is referred to by the slice is referred to, partitioning is performed on the basis of block partitioning information included in the adaptive parameter set, and an index which is included in the adaptive parameter set and which indicates a class classifying method for each of the blocks is referred to for each block. When the index is not an index showing "not performing offset process", each pixel in the block is class classified on a per block basis according to the class classifying method indicated by the index.

As a candidate for class classifying methods, one same as a candidate of class classifying method for the pixel adaptive offset process in the loop filter unit 11 is prepared in advance.

The loop filter unit 38 carries out, by referring to offset information included in an adaptive parameter set for specifying an offset value of each class on a per block basis, a process of adding an offset to a luminance value of the decoded image.

In a pixel adaptive offset process in the loop filter unit 11 of the video encoding device, when a configuration in employed in which block partitioning information is not encoded, an image is always partitioned into blocks each having a fixed size (e.g. on a per largest coding block basis), a class classifying method is selected for each of the blocks, and an adaptive offset process is performed on a per class basis, a pixel adaptive offset process is performed also in the loop filter unit 38 for each block having a fixed size same as that in the loop filter unit 11.

In the adaptive filtering process, an adaptive parameter set which is referred to by the slice is referred to, a class classification is performed, using a filter for each class included in the adaptive parameter set, with a method same as that in the video encoding device shown in FIG. 1, and then a filtering process is performed on the basis of the class classifying information.

When a configuration is employed, in an adaptive filtering process in the loop filter unit 11 of the video encoding device, in which the above-described class classification and filter design/filtering process are performed not on a whole image but, for example, for each block having a fixed size such as a largest coding block, the above-described class classification and filtering process are performed, by decoding filters used in each class, also in the loop filter unit 38 for each block having a fixed size same as that in the loop filter unit 11.

The decoded image on which the filtering process is carried out by this loop filter unit 38 is provided as a reference image for motion-compensated prediction, and is employed as a reproduced image.

As evident from the above, in Embodiment 1, the variable length encoding unit 13 encodes a video parameter set as header information of an encoded bitstream; a flag showing whether or not temporal scalability is employed, the maximum number of hierarchical layers, and the picture buffer size of each hierarchical layer are encoded in the video parameter set; a basic hierarchical layer existence flag showing whether or not encoded data of a basic hierarchical layer is included in encoded data of pictures which refer to the video parameter set is encoded; and the variable length decoding unit 31 decodes the basic hierarchical layer existence flag. Thus, the decoding device can determine whether or not pictures of the basic hierarchical layer are included, and a process can be performed in which, when pictures of the basic hierarchical layer are included, the pictures of the basic hierarchical layer are immediately decoded and in which, when pictures of the basic hierarchical layer are not included, decoding is performed after the pictures of the basic hierarchical layer are decoded. Therefore, a process of scalable encoding and decoding can be carried out in such a way that video data in which only a frame belonging to an upper hierarchical layer is encoded can be separately processed.

In addition, as header information of an encoded bitstream, the variable length encoding unit 13 decodes, in encoded data of a picture which refers to a video parameter set, a lower hierarchical layer reference flag showing whether or not a picture of a hierarchical layer which refers to the video parameter set refers, in a prediction, to pictures of a hierarchical layer lower than that of the picture concerned. Thus, a picture unit (sub bitstream) which refers to the video parameter set can be set regardless of whether or not there exists a hierarchical layer lower than that of the picture concerned, and, when receiving such a sub bitstream, the decoding device can immediately decode the received data, regardless of whether or not pictures of a hierarchical layer lower than that of the picture concerned are already received. Therefore, a device can be obtained in which a process of scalable encoding and decoding can be carried out in such a way that video data in which only a frame belonging to an upper hierarchical layer is encoded can be separately processed.

Embodiment 2

In this embodiment, a sub bitstream generating device will be explained which extracts a sub bitstream from an encoded bitstream generated by the video encoding device in accordance with Embodiment 1.

Figure 20:
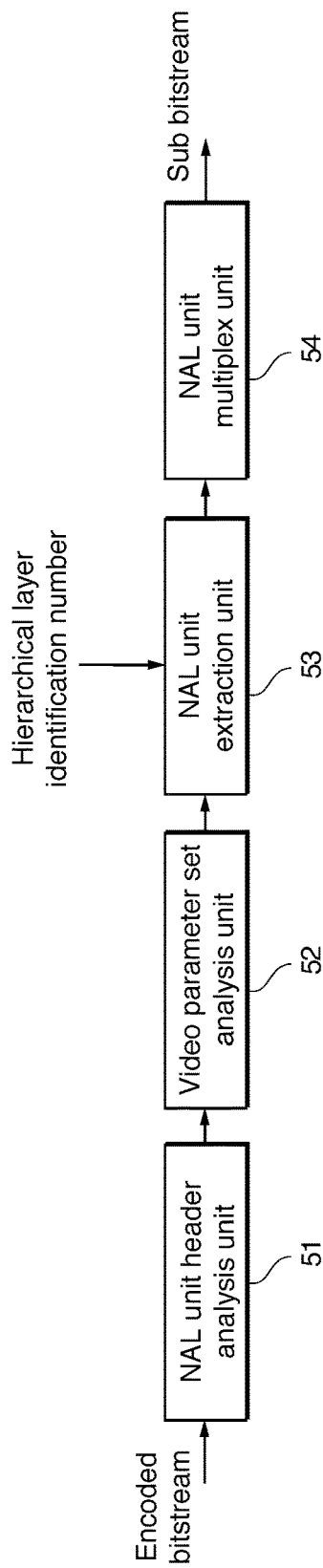
FIG. 20 is an explanatory drawing showing a configuration of a sub bitstream generating device in Embodiment 2 of the present invention.

FIG. 20 shows a configuration of the sub bitstream generating device.

Referring to FIG. 20, a NAL unit header analysis unit 51 receives an encoded bitstream outputted from the variable length encoding unit 13 shown in FIG. 1, analyzes a header section of a NAL unit which constitutes the encoded bitstream, and decodes header information such as type information, a reference flag, and a hierarchical layer identification number. A video parameter set analysis unit 52 decodes, when the type information indicates a video parameter set, the video parameter set included in a payload data section of the NAL unit. When a flag, decoded from the video parameter set, which shows whether or not temporal scalability is employed shows that the encoded bitstream is time hierarchically encoded, the number of hierarchical layers of a sub bitstream is determined on the basis of the maximum number of hierarchical layers decoded from the video parameter set. The number of hierarchical layers of a sub bitstream may be determined on the basis of, for example, a picture buffer size necessary for decoding each hierarchical layer decoded from the video parameter set. When the picture buffer size becomes large, delay of decoded image increases. In this case, the number of hierarchical layers of a sub bitstream may be determined on the basis of the maximum delay permissible in the decoding device. A NAL unit extraction unit 53 extracts the NAL unit on the basis of the determined number of hierarchical layers of the sub bitstream. For example, in an encoded bitstream having three or more hierarchical layers, when the number of hierarchical layers of the sub bitstream is determined to be two, a NAL unit which includes, as payload data, encoded data of pictures belonging to the basic hierarchical layer and the first hierarchical layer is extracted. A NAL unit multiplex unit 54 multiplexes the NAL unit extracted by the NAL unit extraction unit 53, to generate a sub bitstream.

Next, operations will be explained.

A case will be explained as an example in which a sub bitstream is generated from an encoded bitstream which is outputted from the encoding device shown in FIG. 3.

Figure 21:
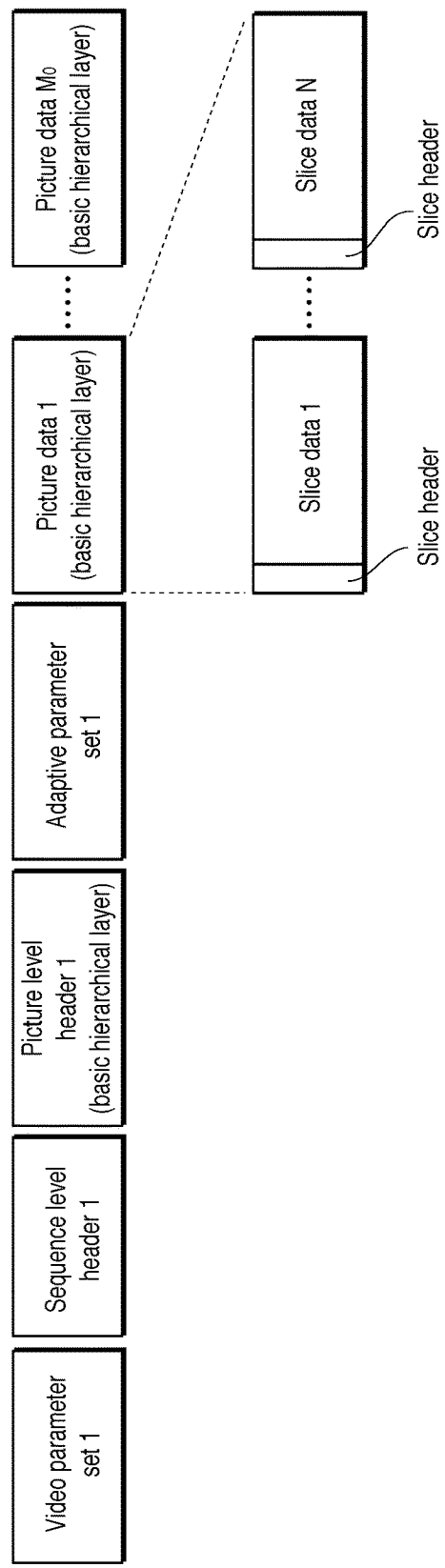
FIG. 21 is an explanatory drawing showing an example of a sub bitstream in Embodiment 2 of the present invention.

First, the NAL unit header analysis unit 51 analyzes a header section of a NAL unit which constitutes an encoded bitstream. When type information decoded from the header section of the NAL unit indicates a video parameter set, the video parameter set analysis unit 52 decodes a video parameter set included in a payload data section of the NAL unit. In the example shown in FIG. 3, the video parameter set analysis unit 52 decodes the video parameter set 1. When a flag, decoded from the video parameter set 1, which shows whether or not temporal scalability is employed shows that the encoded bitstream is time hierarchically encoded, the number of hierarchical layers of a sub bitstream is determined on the basis of the maximum number of hierarchical layers (two in FIG. 3) decoded from the video parameter set. When the number of hierarchical layers of the sub bitstream is determined to be one, the NAL unit extraction unit 53 extracts a NAL unit which includes, as payload data, encoded data of pictures belonging to the basic hierarchical layer. That is, each NAL unit whose hierarchical layer identification number in a NAL unit header is zero is only extracted, by excluding each NAL unit whose hierarchical layer identification number is one or more. The NAL unit multiplex unit 54 multiplexes the NAL unit extracted by the NAL unit extraction unit 53, to generate a sub bitstream. Shown in FIG. 21 is a sub bitstream configured by extracting only the NAL unit of the basic hierarchical layer from the encoded bitstream shown in FIG. 3.

Figure 22:
FIG. 22 is an explanatory drawing showing an example of another sub bitstream in Embodiment 2 of the present invention.

Next, a case will be explained as an example in which a sub bitstream is generated by extracting only the first hierarchical layer from the encoded bitstream shown in FIG. 3. The NAL unit header analysis unit 51 performs the operation same as that when generating the sub bitstream by extracting only the basic hierarchical layer. The NAL unit extraction unit 53 extracts a NAL unit which includes, as payload data, encoded data of pictures belonging to the first hierarchical layer. In the example shown in FIG. 3, since the video parameter set 1 and the sequence level header 1 are commonly referred to by pictures of the basic hierarchical layer and the first hierarchical layer, extraction is performed as encoded data about pictures belonging to the first hierarchical layer. As to picture data (slice data), picture data of pictures belonging to the first hierarchical layer can be extracted by only extracting each NAL unit whose hierarchical layer identification number in a NAL unit header is one. Because a sub bitstream generated by extracting only the first hierarchical layer does not include encoded data of the basic hierarchical layer, a value of a basic hierarchical layer existence flag for the video parameter set 1 is changed from a value (e.g. 1) showing that the basic hierarchical layer is included to a value (e.g. 0) showing that the basic hierarchical layer is not included. The NAL unit multiplex unit 54 multiplexes a video parameter set 1A whose basic hierarchical layer existence flag value has been changed, the sequence level header 1, and the picture level header and the picture data (slice data) of pictures in the first hierarchical layer, to generate a sub bitstream (FIG. 22).

Figure 23:
FIG. 23 is an explanatory drawing showing an example of another sub bitstream in Embodiment 2 of the present invention.

Next, a case will be explained as an example in which a sub bitstream is generated from the encoded bitstream shown in FIG. 12. Since an operation of generating a sub bitstream which includes the basic hierarchical layer is the same as that of generating the sub bitstream from the encoded bitstream shown in FIG. 3, an example will be explained in which a sub bitstream is generated which does not include the basic hierarchical layer, e.g. a sub bitstream configured with only encoded data of pictures belonging to the first hierarchical layer. The NAL unit header analysis unit 51 performs the operation same as that when generating the sub bitstream from the encoded bitstream shown in FIG. 3. The NAL unit extraction unit 53 extracts a NAL unit which includes, as payload data, encoded data of pictures belonging to the first hierarchical layer. In the example shown in FIG. 12, since the video parameter set is encoded for each of the hierarchical layers, pictures belonging to the first hierarchical layer are encoded by referring to the video parameter set 2. Thus, in the example shown in FIG. 12, by only extracting, as encoded data about pictures belonging to the first hierarchical layer, each NAL unit whose hierarchical layer identification number in a NAL unit header is one, the video parameter set 2, the sequence level header 2, and the picture data of pictures belonging to the first hierarchical layer can be extracted. Since a basic hierarchical layer existence flag for the video parameter set 2 has a value showing that the basic hierarchical layer is not included, the NAL unit multiplex unit 54 does not change a parameter value of the video parameter set 2 and multiplexes the video parameter set 2, the sequence level header 2, and the picture level header and the picture data (slice data) of pictures in the first hierarchical layer, to generate a sub bitstream (FIG. 23).

As described above, by extracting encoded data of sub bitstreams on a per NAL unit basis on the basis of information set in the video parameter set, various kinds of sub bitstreams can be generated, and thus a device can be obtained in which a process of scalable encoding and decoding can be carried out.

INDUSTRIAL APPLICABILITY

As described above, the video encoding device, video decoding device, video encoding method, and video decoding method in accordance with the present invention are useful for a video encoding device, a video decoding device, and the like for carrying out a process of scalable encoding and decoding.

REFERENCE NUMERALS

1 block partitioning unit (block partitioning means), 2 encoding controlling unit (encoding controlling means), 3 select switch, 4 intra prediction unit (predicting means), 5 motion-compensated prediction unit (predicting means), 6 subtracting unit (difference image generating means), 7 transformation/quantization unit (image compressing means), 8 inverse quantization/inverse transformation unit (local decoding image generating means), 9 adding unit (local decoding image generating means), 10 memory for intra prediction (predicting means), 11 loop filter unit (filtering means), 12 motion-compensated prediction frame memory (predicting means), 13 variable length encoding unit (variable length encoding means), 14 slice partitioning unit (slice partitioning means), 31 variable length decoding unit (variable length decoding means), 32 inverse quantization/inverse transformation unit (difference image generating means), 33 select switch, 34 intra prediction unit (predicting means), 35 motion compensation unit (predicting means), 36 adding unit (decoded image generating means), 37 memory for intra prediction (predicting means), 38 loop filter unit (filtering means), 39 motion-compensated prediction frame memory (predicting means), 51 NAL unit header analysis unit, 52 video parameter set analysis unit, 53 NAL unit extraction unit, and 54 NAL unit multiplex unit.

The invention claimed is:

1. A video encoding device which stratifies a plurality of pictures of an inputted video signal into a basic hierarchical layer which is a hierarchical layer of a first picture to be referred to for prediction, and a hierarchical layer of a second picture other than the first picture of the basic hierarchical layer, and which encodes the stratified plurality of pictures as picture data which comprises one or more pieces of slice data to generate a coded data which comprises a video parameter set and the picture data, the video encoding device comprising:
an encoder which encodes a basic hierarchical layer existence flag in the video parameter set of the coded data, the basic hierarchical layer existence flag showing whether or not the first picture of the basic hierarchical layer is included in the coded data,
wherein the encoder, from the plurality of pictures of the inputted video signal, generates
a first coded data in which the basic hierarchical layer existence flag shows that the first picture of the basic hierarchical layer is included in the first coded data, and
a second coded data in which the basic hierarchical layer existence flag shows that the first picture of the basic hierarchical layer is not included in the second coded data, the second coded data including the second picture which is prediction-encoded by referring to pixel values of the first picture,
wherein the first picture corresponds to a different video frame signal than the second picture such that the first and second pictures have different temporal positions within the inputted video signal, and
wherein the encoder transmits the first coded data which includes the first picture of the basic hierarchical layer via a different line than the second coded data which does not include the first picture of the basic hierarchical layer.

2. A video decoding device which decodes a coded data which comprises a video parameter set and picture data obtained by stratifying a plurality of pictures of an inputted video into a basic hierarchical layer which is a hierarchical layer of a first picture to be referred to for prediction, and a hierarchical layer of a second picture other than the first picture of the basic hierarchical layer, and by encoding the stratified plurality of pictures as the picture data which comprises one or more pieces of slice data, the video decoding device comprising:
a decoder which decodes a basic hierarchical layer existence flag in the video parameter set of the coded data, the basic hierarchical layer existence flag showing whether or not the first picture of the basic hierarchical layer is included in the coded data,
wherein the decoder decodes the plurality of pictures by using
a first coded data in which the basic hierarchical layer existence flag shows that the first picture of the basic hierarchical layer is included in the coded data, and
a second coded data in which the basic hierarchical layer existence flag shows that the first picture of the basic hierarchical layer is not included in the second coded data, the second coded data including the second picture which is prediction-encoded by referring to pixel values of the first picture,
wherein the first picture corresponds to a different video frame signal than the second picture such that the first and second pictures have different temporal positions within the inputted video signal, and
wherein the decoder receives the first coded data which includes the first picture of the basic hierarchical layer via a different line than the second coded data which does not include the first picture of the basic hierarchical layer.

3. A video encoding method which stratifies a plurality of pictures of an inputted video signal into a basic hierarchical layer which is a hierarchical layer of a first picture to be referred to for prediction, and a hierarchical layer of a second picture other than the first picture of the basic hierarchical layer, and which encodes the stratified plurality of pictures as picture data which comprises one or more pieces of slice data to generate a coded data which comprises a video parameter set and the picture data, the video encoding method comprising:
encoding a basic hierarchical layer existence flag in the video parameter set of the coded data, the basic hierarchical layer existence flag showing whether or not the first picture of the basic hierarchical layer is included in the coded data, and
generating, from the plurality of pictures of the inputted video signal,
a first coded data in which the basic hierarchical layer existence flag shows that the first picture of the basic hierarchical layer is included in the coded data, and
a second coded data in which the basic hierarchical layer existence flag shows that the first picture of the basic hierarchical layer is not included in the second coded data, the second coded data including the second picture which is prediction-encoded by referring to pixel values of the first picture,
wherein the first picture corresponds to a different video frame signal than the second picture such that the first and second pictures have different temporal positions within the inputted video signal, and
further comprising transmitting the first coded data which includes the first picture of the basic hierarchical layer via a different line than the second coded data which does not include the first picture of the basic hierarchical layer.

4. A video decoding method which decodes a coded data which comprises a video parameter set and picture data obtained by stratifying a plurality of pictures of an inputted video into a basic hierarchical layer which is a hierarchical layer of a first picture to be referred to for prediction, and a hierarchical layer of a second picture other than the first picture of the basic hierarchical layer, and by encoding the stratified plurality of pictures as the picture data which comprises one or more pieces of slice data, the video decoding method comprising:
decoding a basic hierarchical layer existence flag in the video parameter set of the coded data, the basic hierarchical layer existence flag showing whether or not the first picture of the basic hierarchical layer is included in the coded data, and
decoding the plurality of pictures by using
a first coded data in which the basic hierarchical layer existence flag shows that the first picture of the basic hierarchical layer is included in the coded data, and
a second coded data in which the basic hierarchical layer existence flag shows that the first picture of the basic hierarchical layer is not included in the second coded data, the second coded data including the second picture which is prediction-encoded by referring to pixel values of the first picture, wherein the first picture corresponds to a different video frame signal than the second picture such that the first and second pictures have different temporal positions within the inputted video signal, and wherein the first coded data which includes the first picture of the basic hierarchical layer is received via a different line than the second coded data which does not include the first picture of the basic hierarchical layer.

\* \* \* \* \*